US011015387B2

(12) United States Patent
Blair et al.

(10) Patent No.: US 11,015,387 B2
(45) Date of Patent: *May 25, 2021

(54) BATTERY-POWERED MOTORIZED WINDOW TREATMENT HAVING A SERVICE POSITION

(71) Applicant: Lutron Technology Company LLC, Coopersburg, PA (US)

(72) Inventors: Edward J. Blair, Telford, PA (US); Samuel F. Chambers, Gwynedd Valley, PA (US); David A. Kirby, Zionsville, PA (US); Peter W. Ogden, Jr., Breinigsville, PA (US); James J. Wilson, Nazareth, PA (US); Justin M. Zernhelt, Northampton, PA (US)

(73) Assignee: LUTRON TECHNOLOGY COMPANY LLC, Coopersburg, PA (US)

( * ) Notice: Subject to any disclaimer, the term of this patent is extended or adjusted under 35 U.S.C. 154(b) by 229 days.

This patent is subject to a terminal disclaimer.

(21) Appl. No.: 15/989,536

(22) Filed: May 25, 2018

(65) Prior Publication Data
US 2018/0274291 A1 Sep. 27, 2018

Related U.S. Application Data

(60) Continuation-in-part of application No. 15/689,653, filed on Aug. 29, 2017, now Pat. No. 10,590,700, and
(Continued)

(51) Int. Cl.
E06B 9/323 (2006.01)
E06B 9/68 (2006.01)
(Continued)

(52) U.S. Cl.
CPC .............. E06B 9/323 (2013.01); B23P 6/00 (2013.01); E06B 9/262 (2013.01); E06B 9/266 (2013.01);
(Continued)

(58) Field of Classification Search
CPC . E06B 9/323; E06B 9/32; E06B 9/322; E06B 9/38; E06B 9/68; E06B 9/72;
(Continued)

(56) References Cited

U.S. PATENT DOCUMENTS 2,203,372 A * 6/1940 Trammell ............... E06B 9/323
160/38
2,225,550 A * 12/1940 Carroll ................... E06B 9/323
248/264
(Continued)

FOREIGN PATENT DOCUMENTS

WO 97/018501 A1 5/1997
WO 2010048118 A1 4/2010

OTHER PUBLICATIONS

Search Report issued by the International Searching Authority dated Jun. 6, 2012 in connection with corresponding PCT application No. PCT/US2012/028329.
(Continued)

Primary Examiner — Johnnie A. Shablack
(74) Attorney, Agent, or Firm — Duane Morris LLP

(57) ABSTRACT

A battery-powered motorized window treatment for covering at least a portion of a window may be adjusted into a service position to allow for access to at least one battery that is powering the motorized window treatment. A headrail of the motorized window treatment may be adjusted to the service position to allow for easy replacement of the batteries without unmounting the headrail and without requiring tools. The motorized window treatment may comprise
(Continued)

brackets having buttons that may be actuated to release the headrail from a locked position, such that the head rail may be rotated into the service position. The headrail easily rotates through a controlled movement into the service position, such that a user only needs one free hand available to move the motorized window treatment into the service position and change the batteries.

17 Claims, 15 Drawing Sheets

Related U.S. Application Data a division of application No. 15/245,790, filed on Aug. 24, 2016, now Pat. No. 9,982,482, said application No. 15/689,653 is a continuation of application No. 14/980,549, filed on Dec. 28, 2015, now Pat. No. 9,745,796, said application No. 15/245,790 is a division of application No. 14/710,028, filed on May 12, 2015, now Pat. No. 9,447,636, said application No. 14/980,549 is a continuation of application No. 14/478,296, filed on Sep. 5, 2014, now Pat. No. 9,249,624, said application No. 14/710,028 is a division of application No. 13/768,587, filed on Feb. 15, 2013, now Pat. No. 9,045,939, application No. 15/989,536, which is a continuation-in-part of application No. 13/415,246, filed on Mar. 8, 2012, now Pat. No. 8,851,141.

(60) Provisional application No. 61/763,207, filed on Feb. 11, 2013, provisional application No. 61/547,319, filed on Oct. 14, 2011, provisional application No. 61/530,799, filed on Sep. 2, 2011, provisional application No. 61/451,960, filed on Mar. 11, 2011.

(51) Int. Cl.
| | |
|---|---|
| *B23P 6/00* | (2006.01) |
| *E06B 9/262* | (2006.01) |
| *E06B 9/32* | (2006.01) |
| *E06B 9/322* | (2006.01) |
| *E06B 9/42* | (2006.01) |
| *E06B 9/72* | (2006.01) |
| *E06B 9/266* | (2006.01) |
| *H02J 7/00* | (2006.01) |
| *E06B 9/62* | (2006.01) |

(52) U.S. Cl.
CPC ............ *E06B 9/32* (2013.01); *E06B 9/322* (2013.01); *E06B 9/42* (2013.01); *E06B 9/68* (2013.01); *E06B 9/72* (2013.01); *H02J 7/0045* (2013.01); *E06B 9/62* (2013.01); *E06B 2009/2625* (2013.01); *E06B 2009/2627* (2013.01); *E06B 2009/3225* (2013.01); *E06B 2009/6809* (2013.01); *E06B 2009/6818* (2013.01); *E06B 2009/6845* (2013.01); *E06B 2009/6872* (2013.01); *Y10T 29/4973* (2015.01)

(58) Field of Classification Search
CPC ..... E06B 9/70; E06B 9/62; E06B 9/17; E06B 9/17007; E06B 9/17015; E06B 9/17023; E06B 9/1703; E06B 9/262; E06B 9/266; E06B 2009/2625; E06B 2009/2627
See application file for complete search history.

(56) References Cited

U.S. PATENT DOCUMENTS

| | | | |
|---|---|---|---|
| 2,272,956 A * | 2/1942 | Stuber | A47H 2/00 160/38 |
| 2,281,043 A * | 4/1942 | Nelson | E06B 9/323 248/264 |
| 2,498,067 A * | 2/1950 | Chatfield | E06B 9/323 248/264 |
| 2,580,103 A | 12/1951 | Keller et al. | |
| 2,645,281 A * | 7/1953 | Nelson | E06B 9/323 160/38 |
| 2,706,521 A * | 4/1955 | Nelson | A47H 2/00 160/38 |
| 2,802,523 A | 8/1957 | Anderle | |
| 3,169,006 A | 2/1965 | Lorentzen et al. | |
| 3,222,689 A | 12/1965 | Efron et al. | |
| 4,071,215 A | 1/1978 | Marotto | |
| 4,197,896 A | 4/1980 | Reichstadt | |
| 4,265,423 A * | 5/1981 | Vecchiarelli | E06B 9/323 160/902 |
| 4,282,919 A | 8/1981 | Teno | |
| 4,314,294 A | 2/1982 | Riccio et al. | |
| 4,531,562 A | 7/1985 | Swanson | |
| 4,718,471 A | 1/1988 | Kraeutler | |
| 4,885,219 A | 12/1989 | Miller | |
| 4,941,000 A | 7/1990 | Cardoos, Jr. et al. | |
| 5,042,553 A | 8/1991 | Schaffer et al. | |
| 5,074,350 A | 12/1991 | Carter | |
| 5,230,493 A * | 7/1993 | Luoto | E06B 9/323 248/251 |
| 5,333,664 A | 8/1994 | Sirianni et al. | |
| 5,391,967 A | 2/1995 | Domel et al. | |
| 5,467,266 A | 11/1995 | Jacobs et al. | |
| 5,804,332 A | 9/1998 | Shimizu et al. | |
| 5,883,480 A | 3/1999 | Domel et al. | |
| 5,990,646 A | 11/1999 | Kovach et al. | |
| 6,259,218 B1 | 7/2001 | Kovach et al. | |
| 6,371,192 B1 | 4/2002 | Anderson et al. | |
| 6,382,294 B1 | 5/2002 | Anderson et al. | |
| 6,433,498 B1 | 8/2002 | Domel et al. | |
| 6,446,693 B1 | 9/2002 | Anderson et al. | |
| 6,516,858 B1 | 2/2003 | Anderson et al. | |
| 6,533,018 B2 | 3/2003 | Anderson et al. | |
| 6,688,368 B2 | 2/2004 | Kovach et al. | |
| 6,736,186 B2 | 5/2004 | Anderson et al. | |
| 6,850,017 B1 | 2/2005 | Domel et al. | |
| 7,134,469 B2 | 11/2006 | Drew et al. | |
| 7,299,848 B2 | 11/2007 | Streib et al. | |
| 7,389,806 B2 | 6/2008 | Kates | |
| 7,401,634 B2 | 7/2008 | Kovach et al. | |
| 7,451,803 B2 | 11/2008 | Jorgensen et al. | |
| 7,517,609 B2 | 4/2009 | Cheng | |
| 7,673,667 B2 | 3/2010 | Domel et al. | |
| 7,857,030 B2 | 12/2010 | Cheng | |
| 8,371,358 B1 | 2/2013 | Mullet et al. | |
| 8,540,005 B2 | 9/2013 | Baugh et al. | |
| 8,723,455 B2 | 5/2014 | Mullet et al. | |
| 8,820,388 B2 | 9/2014 | Mullet et al. | |
| 8,851,141 B2 | 10/2014 | Blair et al. | |
| 8,950,461 B2 | 2/2015 | Adams et al. | |
| 9,045,939 B2 | 6/2015 | Blair et al. | |
| 9,115,537 B2 | 8/2015 | Blair | |
| 9,249,624 B2 | 2/2016 | Blair et al. | |
| 9,447,636 B2 | 9/2016 | Blair et al. | |
| 9,488,000 B2 | 11/2016 | Kirby et al. | |
| 9,605,478 B2 | 3/2017 | Adams et al. | |
| 9,745,796 B2 | 8/2017 | Blair et al. | |
| 9,810,020 B2 | 11/2017 | Adams et al. | |
| 9,903,155 B1 * | 2/2018 | Wagner | E06B 9/264 |
| 9,982,482 B2 | 5/2018 | Blair et al. | |
| 10,094,169 B2 | 10/2018 | Kirby | |
| 10,132,116 B2 | 11/2018 | Kirby et al. | |
| 10,590,700 B2 * | 3/2020 | Blair | E06B 9/70 |
| 2003/0168187 A1 | 9/2003 | Wen et al. | |
| 2006/0162874 A1 | 7/2006 | Lin | |
| 2006/0169419 A1 | 8/2006 | Cheng | |

(56) References Cited

U.S. PATENT DOCUMENTS

| | | |
|---|---|---|
| 2007/0089841 A1 | 4/2007 | Rossato et al. |
| 2007/0144684 A1 | 6/2007 | Hutchings et al. |
| 2007/0284053 A1 | 12/2007 | Mullet et al. |
| 2008/0236763 A1 | 10/2008 | Kates |
| 2009/0014132 A1 | 1/2009 | Cheng |
| 2009/0199975 A1 | 8/2009 | Yeh |
| 2010/0092855 A1 | 4/2010 | Cheng |
| 2010/0269988 A1 | 10/2010 | Mullet et al. |
| 2011/0203748 A1 | 8/2011 | Mullet et al. |
| 2011/0203754 A1 | 8/2011 | Mullet et al. |
| 2011/0253319 A1 | 10/2011 | Schaupp |
| 2011/0253320 A1 | 10/2011 | Baugh et al. |
| 2011/0265958 A1 | 11/2011 | Skinner et al. |
| 2012/0031571 A1 | 2/2012 | Mullet et al. |
| 2012/0090797 A1 | 4/2012 | Mullet et al. |
| 2012/0225340 A1 | 9/2012 | Mullet et al. |
| 2012/0234504 A1 | 9/2012 | Skinner et al. |
| 2012/0255689 A1 | 10/2012 | Blair et al. |
| 2012/0261078 A1 | 10/2012 | Adams et al. |
| 2012/0261079 A1 | 10/2012 | Chambers et al. |
| 2013/0098561 A1 | 4/2013 | Mullet et al. |
| 2013/0153162 A1 | 6/2013 | Blair et al. |
| 2013/0233496 A1 | 9/2013 | Ogden, Jr. et al. |
| 2014/0231032 A1 | 8/2014 | Blair |
| 2014/0305601 A1 | 10/2014 | Mullet et al. |
| 2014/0305602 A1 | 10/2014 | Kirby et al. |
| 2014/0374033 A1 | 12/2014 | Blair et al. |
| 2015/0159433 A1 | 6/2015 | Adams et al. |
| 2015/0226001 A1 | 8/2015 | Adams et al. |
| 2015/0240560 A1 | 8/2015 | Blair et al. |
| 2015/0247362 A1 | 9/2015 | Kirby |
| 2015/0300079 A1 | 10/2015 | Dallan |
| 2016/0123076 A1 | 5/2016 | Kirby |
| 2016/0201389 A1 | 7/2016 | Oakley |
| 2016/0362932 A1 | 12/2016 | Blair et al. |
| 2017/0044824 A1 | 2/2017 | Kirby et al. |
| 2017/0260806 A1 | 9/2017 | Adams et al. |
| 2017/0260808 A1 | 9/2017 | Adams et al. |
| 2017/0362891 A1 | 12/2017 | Blair et al. |
| 2018/0274291 A1 | 9/2018 | Blair et al. |

OTHER PUBLICATIONS

International Preliminary Report on Patentability dated Sep. 26, 2013 issed in corresponding PCT International Application No. PCT/US2012/028329.

Online video of virtual presenter; http://www.youtube.com/watch?v=2zJklWbmM2c Uploaded Oct. 13, 2009, One Stop Decorating Center; Changing Batteries in an '09 or older Hunter Douglas Duette Powerrise.

Online video of virtual presenter; http://www.youtube.com/watch?v=MhJli3_ebXM Published Apr. 5, 2013, Stamper's Blinds Gallery; Replace batteries in Hunter Douglas Duette PowerRise by Stamper's Blinds Gallery.

Online video of virtual presenter; http://www.youtube.com/watch?v=RZyikjAypo8 Published Sep. 8, 2013, Paul Kempler; Chanding Batteries on hunter Douglas Duette PowerRise Shades.

* cited by examiner

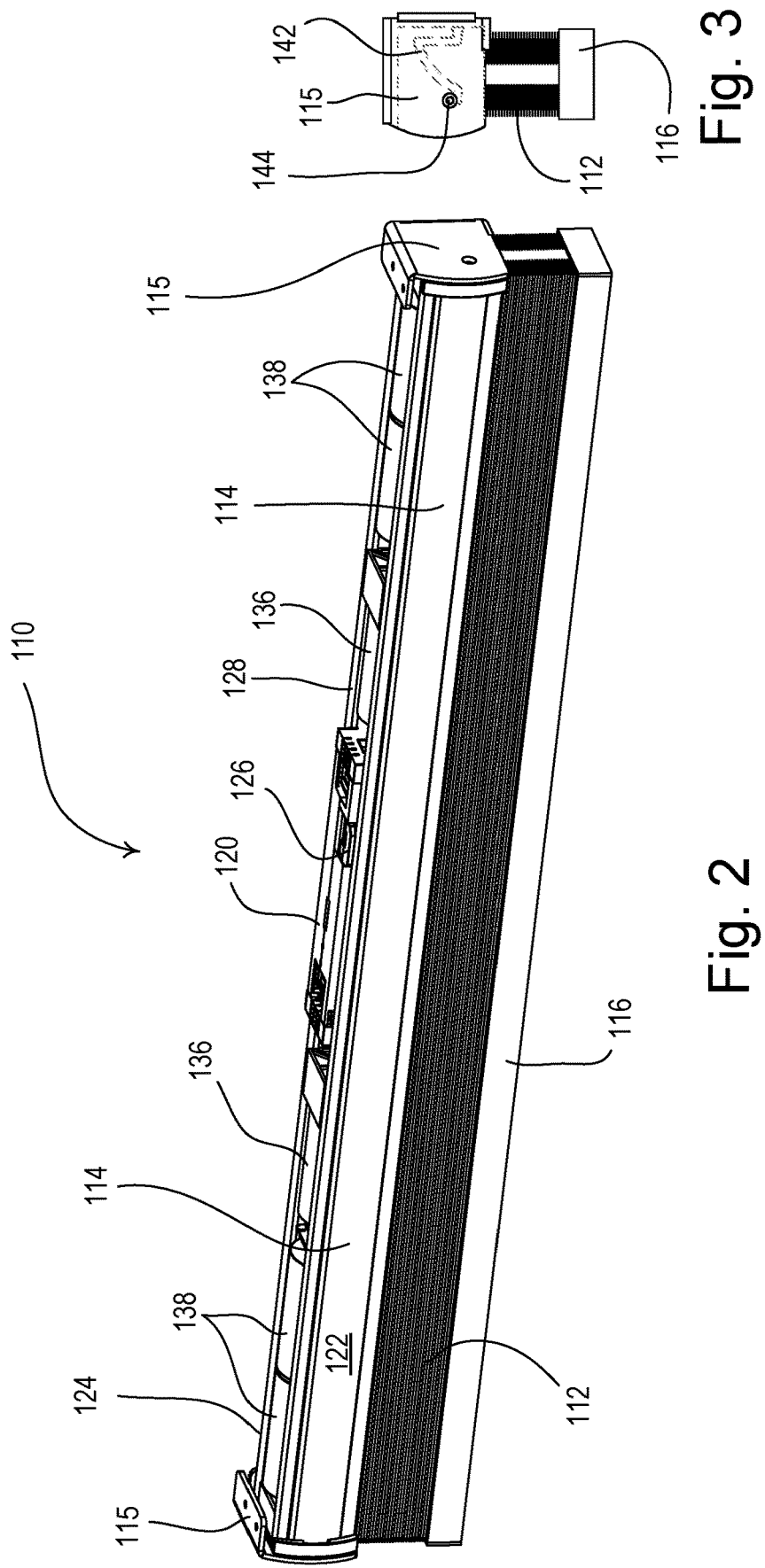

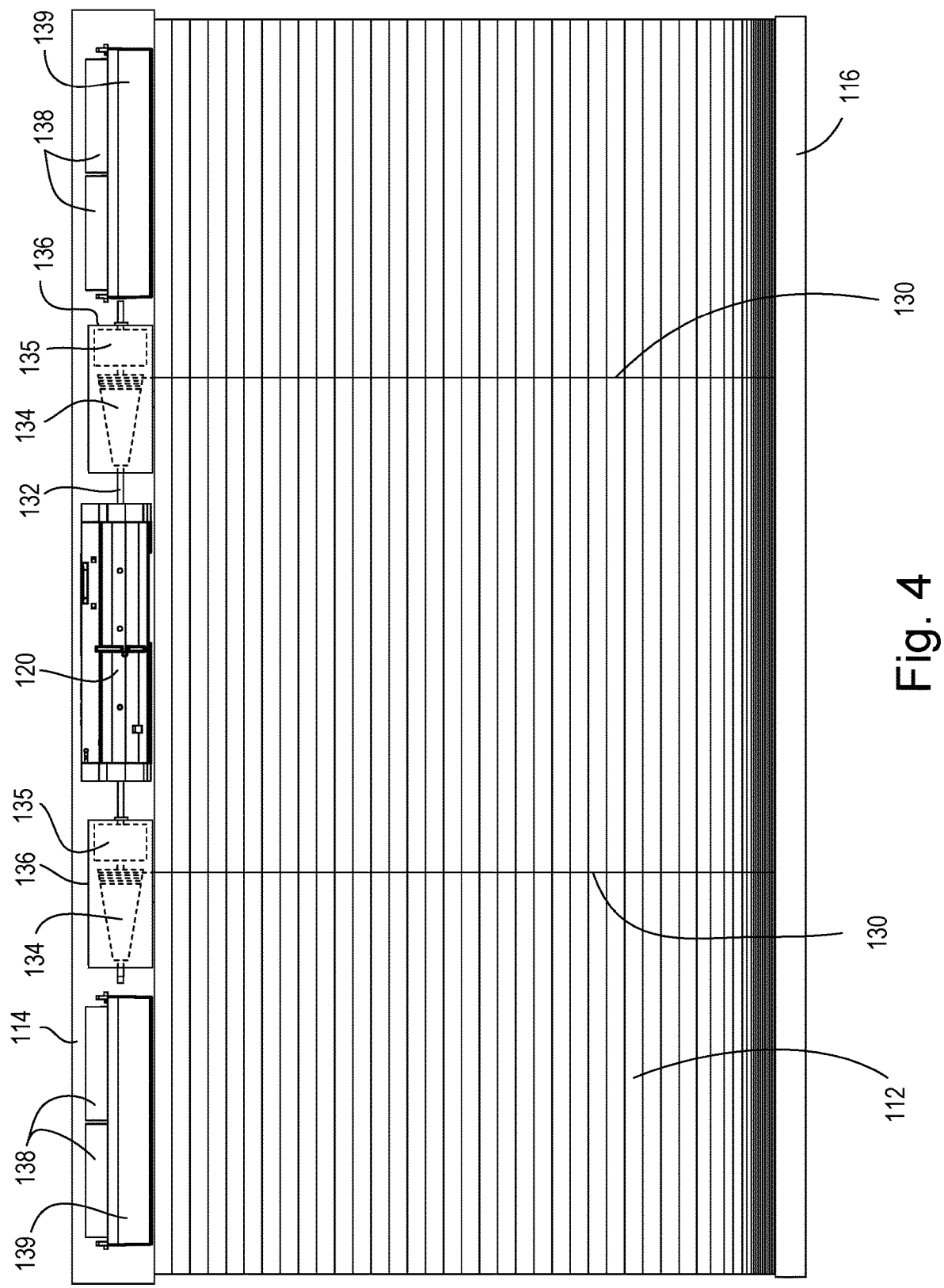

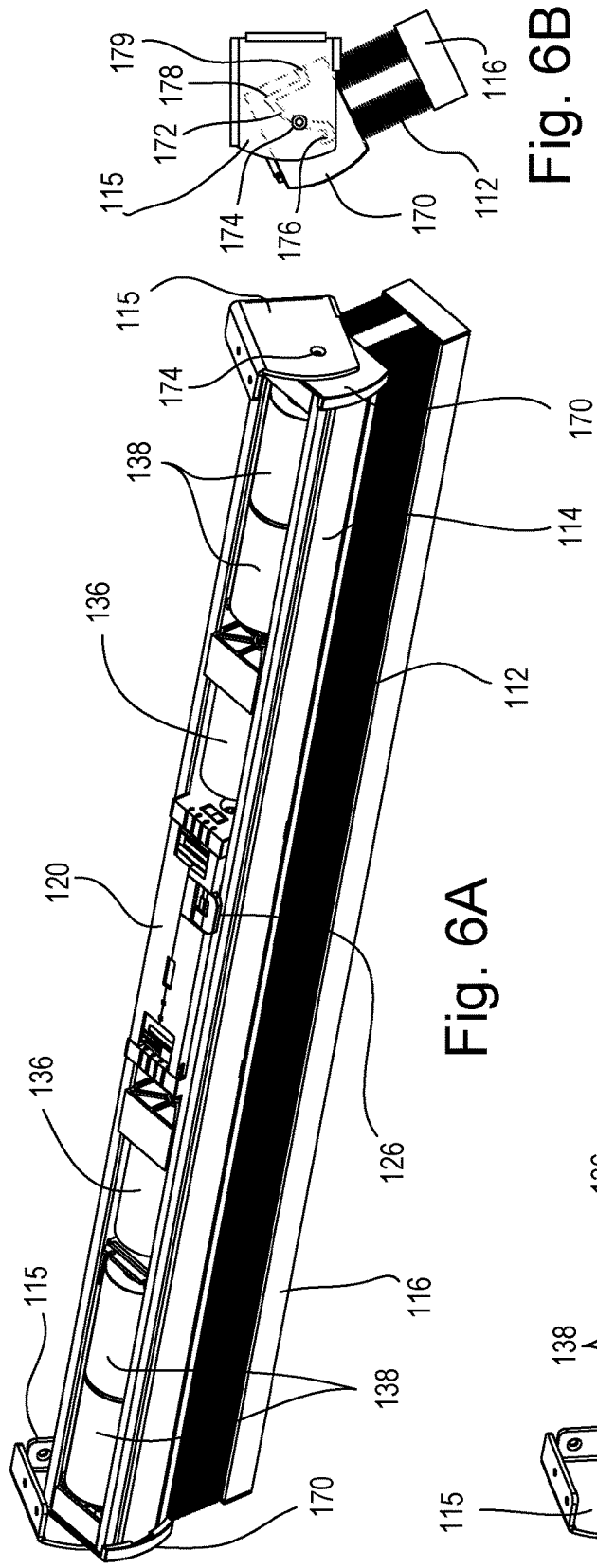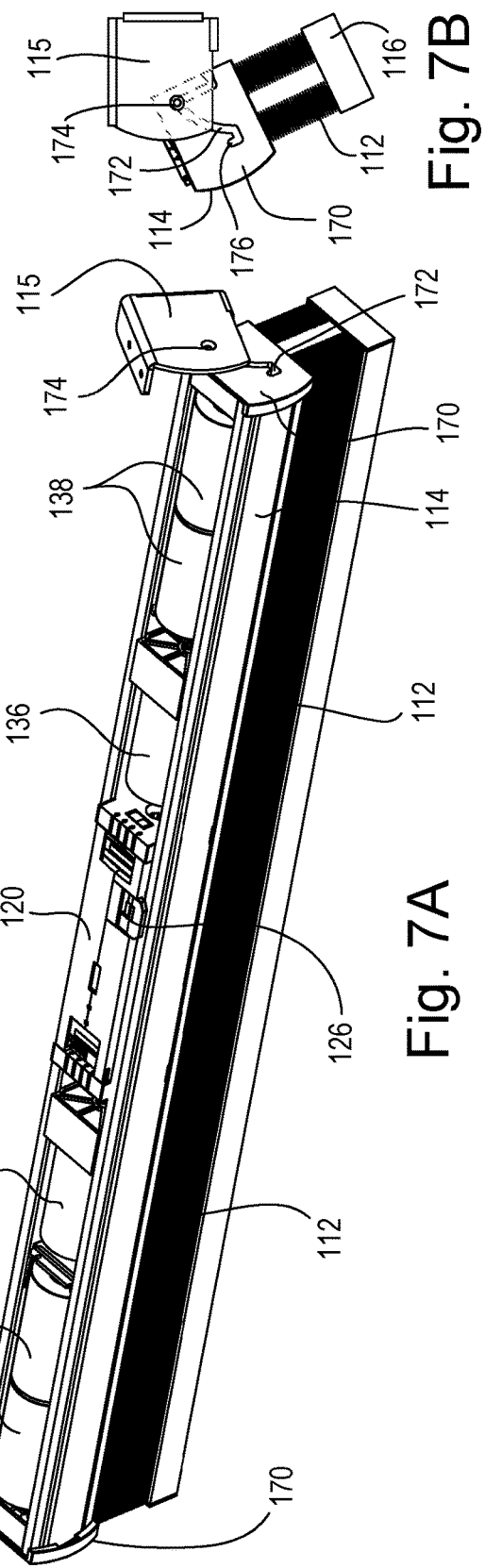

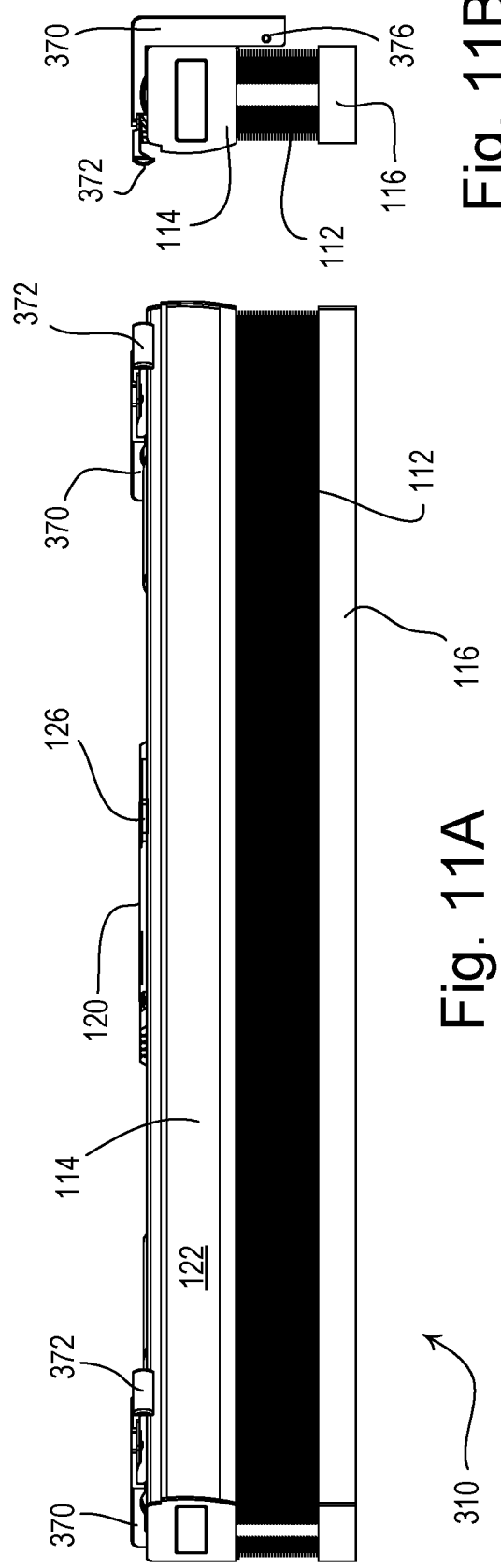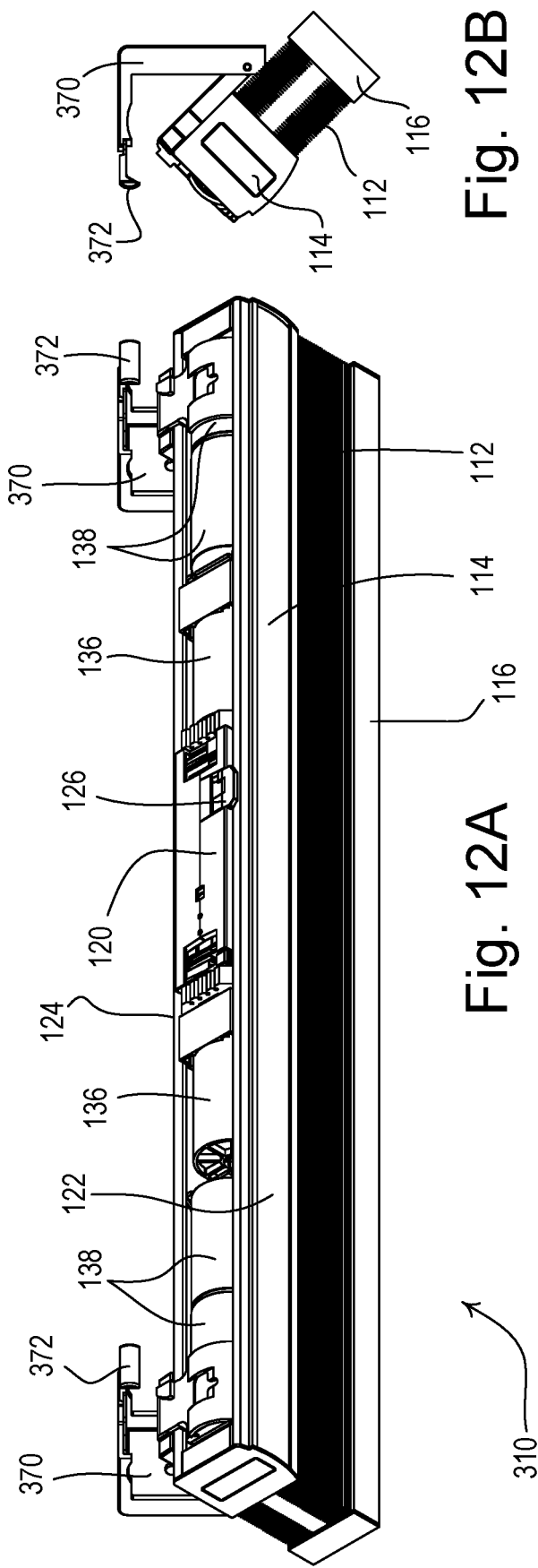

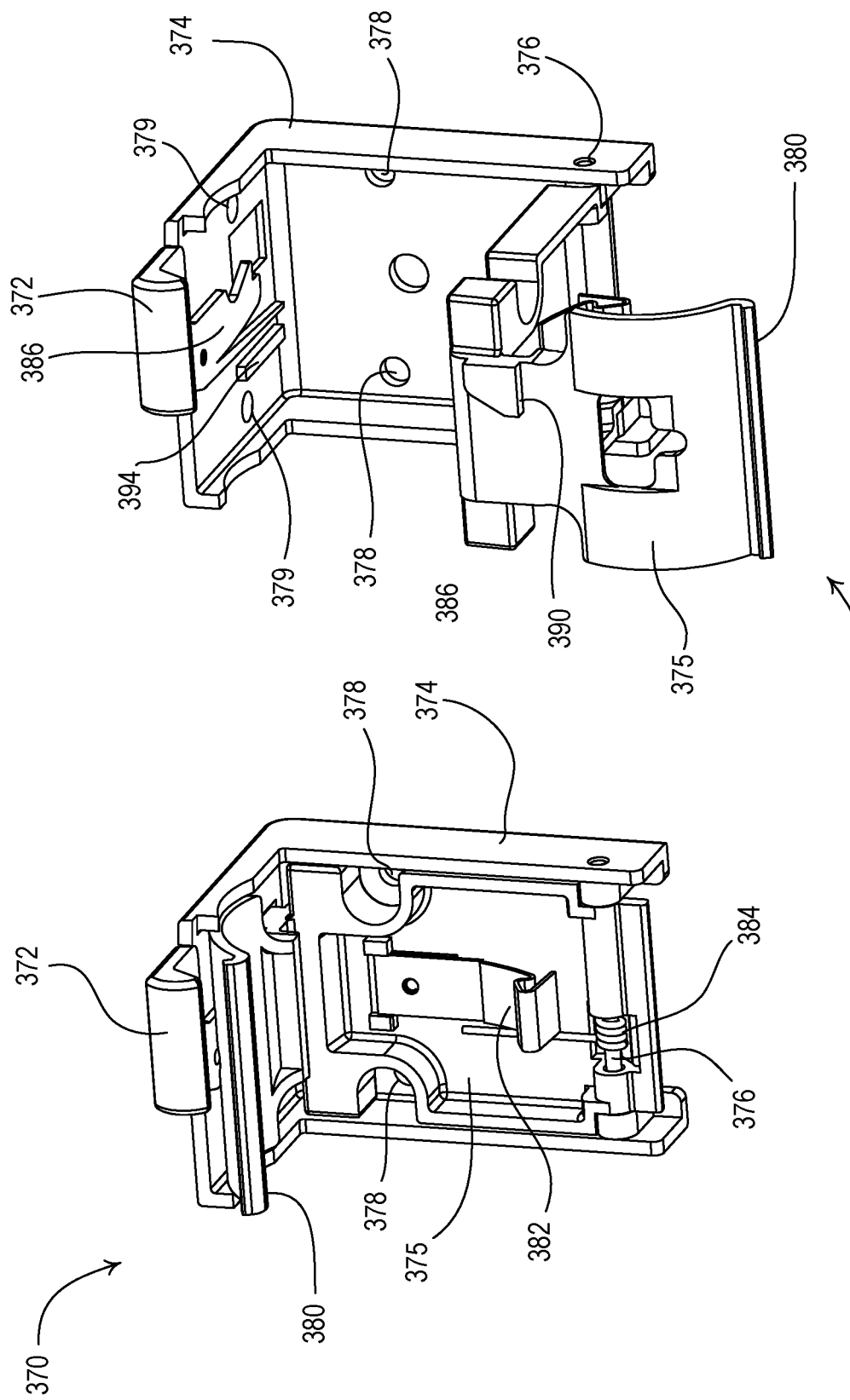

BATTERY-POWERED MOTORIZED WINDOW TREATMENT HAVING A SERVICE POSITION

CROSS-REFERENCE TO RELATED APPLICATIONS

This application is a divisional application of U.S. patent application Ser. No. 15/245,790, filed Aug. 24, 2016, which is a divisional application of U.S. Ser. No. 14/710,028, filed May 12, 2015, now U.S. Pat. No. 9,447,636, issued Sep. 20, 2016, which is a divisional application of U.S. Ser. No. 13/768,587, filed Feb. 15, 2013, now U.S. Pat. No. 9,045,939, issued Jun. 2, 2015 which is a non-provisional application of U.S. Provisional Application No. 61/763,207, filed Feb. 11, 2013, and is a continuation-in-part application of commonly-assigned U.S. patent application Ser. No. 13/415,246, filed Mar. 8, 2012, now U.S. Pat. No. 8,851,141, issued Oct. 7, 2014, entitled BATTERY-POWERED MOTORIZED WINDOW TREATMENT HAVING A SERVICE POSITION, which is a non-provisional application of U.S. Provisional Application No. 61/451,960, filed Mar. 11, 2011, and U.S. Provisional Application No. 61/530,799, filed Sep. 2, 2011, both entitled MANUAL ROLLER SHADE SYSTEM; this application is further a continuation-in-part of U.S. Ser. No. 15/689,653, filed Aug. 29, 2017, which is a continuation of U.S. Ser. No. 14/980,549, filed Dec. 28, 2015, now U.S. Pat. No. 9,745,796, issued Aug. 29, 2017, which is a continuation of U.S. Ser. No. 14/478,296, filed Sep. 5, 2014, now U.S. Pat. No. 9,249,624, issued Feb. 2, 2016, which is a continuation of U.S. Ser. No. 13/415,246, filed Mar. 8, 2012, now U.S. Pat. No. 8,851,141, issued Oct. 7, 2014, each entitled BATTERY-POWERED MOTORIZED WINDOW TREATMENT HAVING A SERVICE POSITION, which is a non-provisional application of U.S. Provisional Application No. 61/451,960, filed Mar. 11, 2011, and U.S. Provisional Patent Application No. 61/530,799, filed Sep. 2, 2011, and U.S. Provisional Application No. 61/547,319, filed Oct. 11, 2011, each entitled MOTORIZED WINDOW TREATMENT; the disclosures of each of the above identified Applications and Patents are hereby incorporated herein by reference in their entireties.

BACKGROUND OF THE INVENTION

Field of the Invention

The present invention relates to a motorized window treatment, and more specifically, to a battery-powered motorized window blind or roller shade system having a service position to allow for easy removal and installation of batteries.

Description of the Related Art

Motorized window treatments typically include a flexible fabric or other means for covering a window in order to block or limit the daylight entering a space and to provide privacy. The motorized window treatments may comprise roller shades, cellular shades, Roman shades, Venentian blinds, and draperies. The motorized window treatments include a motor drive for movement of the fabric in front of the window to control the amount of the window that is covered by the fabric. For example, a motorized roller shade includes a flexible shade fabric wound onto an elongated roller tube with an electronic drive unit installed in the roller tube. The electronic drive unit includes a motor, such as a direct-current (DC) motor, which is operable to rotate the roller tube upon being energized by a DC voltage.

Prior art electronic drive units are typically powered directly from an AC mains line voltage (e.g., 120 VAC) or from a low-voltage DC voltage (e.g., approximately 24 VDC) provided by an external transformer. Unfortunately, this requires that electrical wires to be run from the power source to the electronic drive unit. Running additional AC main line voltage wiring to the electronic drive unit can be very expensive, due to the cost of the additional electrical wiring as well as the cost of installation. Typically, installing new AC main line voltage wiring requires a licensed electrician to perform the work. In addition, if the pre-existing wiring runs behind a fixed ceiling or wall (e.g., one comprising plaster or expensive hardwood), the electrician may need to breach the ceiling or wall to install the new electrical wiring, which will thus require subsequent repair. In some installations where low voltage (e.g., from a low-voltage DC transformer) is used to the power the electronic drive unit, the electrical wires have been mounted on an external surface of a wall or ceiling between the electronic drive unit and the transformer, which is plugged into an electrical receptacle. However, this sort of installation requires the permanent use of one of the outlets of the electrical receptacle and is aesthetically unpleasing due to the external electrical wires.

Therefore, some prior art motorized window treatments have been battery powered, such that the motorized window treatments may be installed without requiring any additional wiring. Examples of prior art battery-powered motorized window treatments are described in greater detail in U.S. Pat. No. 5,883,480, issued Mar. 16, 1999, entitled WINDOW COVERING WITH HEAD RAIL-MOUNTED ACTUATOR; U.S. Pat. No. 5,990,646, issued Nov. 23, 2009, entitled REMOTELY-CONTROLLED BATTERY POWERED-WINDOW COVERING HAVING POWER SAVING RECEIVER; and U.S. Pat. No. 7,389,806, issued Jun. 24, 2008, entitled MOTORIZED WINDOW SHADE SYSTEM; the entire disclosures of which are hereby incorporated by reference.

However, the typical prior art battery-powered motorized window treatments have suffered from poor battery life (such as, one year or less), and have required batteries that are difficult and expensive to replace. Thus, there is a need for a low-cost battery-powered motorized window treatment that has longer battery life and makes battery power practical and convenient for the end user.

SUMMARY OF THE INVENTION

The present invention provides a low-cost, quiet, battery-powered motorized window treatment (e.g., a cellular shade or a roller shade) for controlling the position of a covering material that is adapted to hang in front of an opening, such as a window. The motorized window treatment is powered by batteries that are not expensive to replace and have a much longer (and more practical) lifetime than the typical prior art battery-powered motorized window treatment (e.g., approximately three years). The batteries may be located inside an enclosure (e.g., a headrail) of the motorized window treatment and thus out of view of a user of the motorized window treatment. The enclosure may be adjusted to a service position to provide access to the batteries to allow for easy replacement of the batteries without unmounting the motorized window treatment. No tools are required to move the motorized window treatment into the service position, and the motorized window treatment easily rotates through a controlled movement into the service position. The user only needs one free hand available to move the motorized window treatment into the service position and change the batteries, such that the other hand may be used to balance the user, for example, by holding onto a ladder.

According to an embodiment of the present invention, a battery-powered motorized window treatment is adapted to be mounted to a surface for covering at least a portion of a window and may be adjusted into a service position to allow for access to at least one battery that is powering the motorized window treatment. The motorized window treatment comprises a covering material, a motor drive unit adapted to be disposed near a top of the window for controlling the covering material between a fully-opened and a fully-closed position, an enclosure also adapted to be disposed near the top of the window, and at least one mounting bracket for coupling the enclosure to the surface. The enclosure includes a compartment for receiving the at least one battery for powering the motor drive unit. The mounting bracket remains coupled to the surface and the enclosure remains coupled to the mounting bracket when the motorized window treatment is in the service position.

In addition, a mounting bracket for a motorized window treatment that is adapted to be mounted to a surface and includes an enclosure and a covering material adapted to hang from a position adjacent the enclosure to cover at least a portion of a window is also described herein. The mounting bracket comprises a mounting portion adapted to be fastened to the surface, and a rotating portion that is coupled to a top side of the enclosure and comprises a clip adapted to be coupled to a bottom side of the enclosure. The mounting bracket further comprises an axle for rotatably coupling the rotating portion to the mounting portion, such that the rotating portion pivots about the axle with respect to the mounting portion. The axle is located below the clip of the rotating portion, such that the center of gravity of the motorized window treatment is adapted to cause the enclosure to rotate away from the window on its own.

According to another embodiment of the present invention, a battery-powered motorized roller shade comprises: (1) first and second roller tube end brackets; (2) a roller tube mounted between the first and second roller tube brackets; (3) a flexible shade fabric windingly received around the roller tube, the shade fabric having a first fabric end connected to the roller tube and a second fabric end opposite the first fabric end; (4) a motor drive unit located inside the roller tube for controlling the covering material between a fully-opened and a fully-closed position; (5) an enclosure connected to the first and second roller tube end brackets, the enclosure including a compartment for receiving at least one battery for powering the motor drive unit; and (6) at least one mounting bracket for coupling the enclosure to a surface. The motorized roller tube is operable to be adjusted into a service position in which access is provided to the at least one battery. The mounting bracket remains coupled to the surface and the enclosure remains coupled to the mounting bracket when the motorized roller shade is in the service position.

A method of changing batteries of a battery-powered motorized window treatment connected to a location at the top of a window is also described herein. The method comprises: (1) mounting the batteries in an open-ended enclosure fixed to a motor drive unit of the motorized window treatment; and (2) rotating the motor drive unit and the enclosure from an installed position to a service position to expose the batteries contained within the enclosure without removing the motor drive unit and the enclosure from the window.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which:

FIG. 2 is a perspective view of the battery-powered motorized window treatment of FIG. 1 in a full-opened position;

FIG. 3 is a right side view of the battery-powered motorized window treatment of FIG. 1;

FIG. 4 is a front view of the battery-powered motorized window treatment of FIG. 1;

FIG. 6A is a perspective view of a motorized window treatment as the motorized window treatment is being moved to a service position;

FIG. 6B is a right side view of the motorized window treatment of FIG. 6A as the motorized window treatment is being moved to the service position;

FIG. 7A is a perspective view of the motorized window treatment of FIG. 6A when the motorized window treatment is in the service position;

FIG. 7B is a right side view of the motorized window treatment of FIG. 6A when the motorized window treatment is in the service position;

FIG. 11A is a perspective view of a motorized window treatment having mounting brackets for rotating the motorized window treatment into a service position;

FIG. 11B is a right side view of the motorized window treatment of FIG. 11A;

FIG. 12A is a perspective view of the motorized window treatment of FIG. 11A in the service position;

FIG. 12B is a right side view of the motorized window treatment of FIG. 11A in the service position;

FIG. 13A is an enlarged perspective view of one of the mounting brackets of the motorized window treatment of FIG. 11A in a locked position;

FIG. 13B is an enlarged perspective view of the mounting bracket of FIG. 13A in the service position;

DETAILED DESCRIPTION OF THE INVENTION

Figure 1:
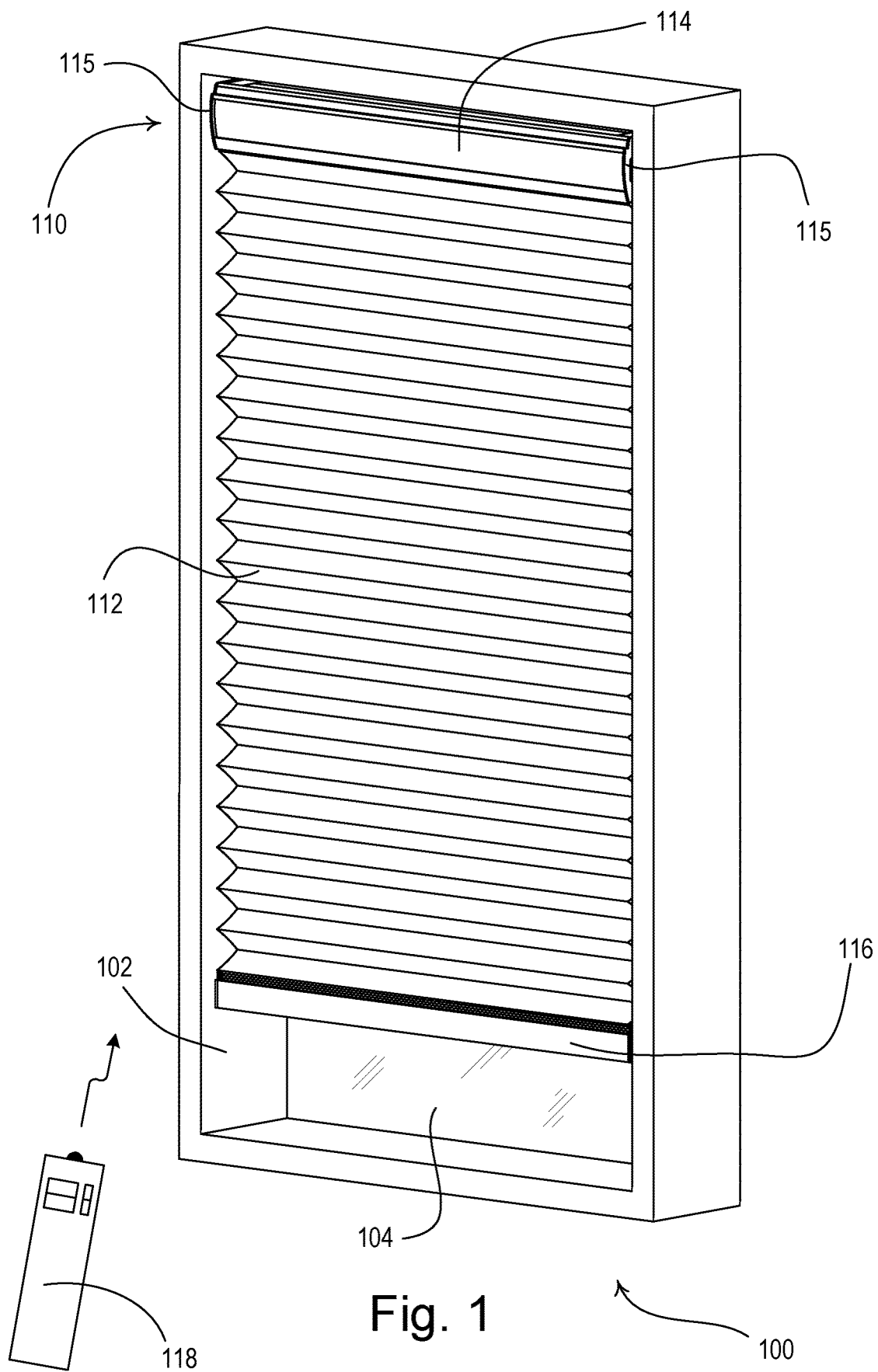
FIG. 1 is a perspective view of an example motorized window treatment system having a battery-powered motorized window treatment and a remote control.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a perspective view of an example motorized window treatment system 100 having a battery-powered motorized window treatment 110 mounted in an opening 102, for example, in front of a window 104. The battery-powered motorized window treatment 110 comprises a covering material, for example, a cellular shade fabric 112 as shown in FIG. 1. The cellular shade fabric 112 has a top end connected to a headrail 114 (e.g., an open-ended enclosure) and a bottom end connected to a weighting element 116. The headrail 114 extends between two mounting plates 115 that may be connected to the sides of the opening 102 as shown in FIG. 1. The cellular shade fabric 112 is able to hang from a position adjacent to the headrail 114 (e.g., on the headrail) in front of the window 104, and may be adjusted between a fully-open position $P_{FULLY-OPEN}$ and a fully-closed position $P_{FULLY-CLOSED}$ to control the amount of daylight entering a room or space. Alternatively, the mounting plates 115 of the battery-powered motorized window treatment 110 could be mounted externally to the opening 102 (e.g., above the opening) with the shade fabric 112 hanging in front of the opening and the window 104. In addition, the battery-powered motorized window treatment 110 could alternatively comprise other types of covering materials, such as, for example, a plurality of horizontally-extending slats (i.e., a Venetian or Persian blind system), pleated blinds, a roller shade fabric, or a Roman shade fabric. The motorized window treatment system 100 comprises an infrared (IR) remote control 118 for controlling the operation of the motorized window treatment 110.

FIG. 2 is a perspective view and FIG. 3 is a right side view of the battery-powered motorized window treatment 110 with the cellular shade fabric 112 in the fully-open position $P_{FULLY-OPEN}$. The motorized window treatment 110 comprises a motor drive unit 120 for raising and lowering the weighting element 116 and the cellular shade fabric 112 between the fully-open position $P_{FULLY-OPEN}$ and the fully-closed position $P_{FULLY-CLOSED}$. By controlling the amount of the window 104 covered by the cellular shade fabric 112, the motorized window treatment 110 is able to control the amount of daylight entering the room. The headrail 114 of the motorized window treatment 110 comprises an internal side 122 and an opposite external side 124, which faces the window 104 that the shade fabric 112 is covering. The motor drive unit 120 comprises an actuator 126, which is positioned adjacent the internal side 122 of the headrail 114 may may be actuated when a user is configuring the motorized window treatment 110. The actuator 126 may be made of, for example, a clear material, such that the actuator may operate as a light pipe to conduct illumination from inside the motor drive unit 120 to thus be provide feedback to the user of the motorized window treatment 110. In addition, the actuator 126 may also function as an IR-receiving lens for directing IR signals transmitted by the IR remote control 118 to an IR receiver 166 (FIG. 11) inside the motor drive unit 120. The motor drive unit 120 is operable to determine a target position $P_{TARGET}$ for the weighting element 116 in response to commands included in the IR signals received from the remote control 118 and to subsequently control a present position $P_{PRES}$ of the weighting element to the target position $P_{TARGET}$. As shown in FIG. 2, a top side 128 of the headrail 114 is open (i.e., an open end of the headrail faces upwardly), such that the motor drive unit 120 may be positioned inside the headrail and the actuator 126 may protrude slightly over the internal side 122 of the headrail.

FIG. 4 is a front view of the battery-powered motorized window treatment 110 with a front portion of the headrail 114 removed to show the motor drive unit 120. The motorized window treatment 110 comprises lift cords 130 that extend from the headrail 114 to the weighting element 116 for allowing the motor drive unit 120 to raise and lower the weighting element. The motor drive unit 120 includes an internal motor 150 (FIG. 5) coupled to drive shafts 132 that extend from the motor on each side of the motor and are each coupled to a respective lift cord spool 134. The lift cords 130 are windingly received around the lift cord spools 134 and are fixedly attached to the weighting element 116, such that the motor drive unit 120 is operable to rotate the drive shafts 132 to raise and lower the weighting element. The motorized window treatment 110 further comprises two constant-force spring assist assemblies 135, which are each coupled to the drive shafts 132 adjacent to one of the two lift cord spools 134. Each of the lift cord spools 134 and the adjacent constant-force spring assist assembly 135 are housed in a respective lift cord spool enclosure 136 as shown in FIG. 4. Alternatively, the motor drive unit 120 could be located at either end of the headrail 114 and the motorized window treatment 110 could comprise a single drive shaft that extends along the length of the headrail and is coupled to both of the lift cord spools 134.

The battery-powered motorized window treatment 110 also comprises a plurality of batteries 138 (e.g., four D-cell batteries), which are electrically coupled in series. The series-combination of the batteries 138 is coupled to the motor drive unit 120 for powering the motor drive unit. The batteries 138 are housed inside the headrail 114 and thus out of view of a user of the motorized window treatment 110. Specifically, the batteries 138 are mounted in two battery holders 139 located inside the headrail 114, such that there are two batteries in each battery holder as shown in FIG. 4. The batteries 138 provide the motorized window treatment 110 with a practical lifetime (e.g., approximately three years), and are typical "off-the-shelf" batteries that are easy and not expensive to replace. Alternatively, the motor drive unit 120 could comprise more batteries (e.g., six or eight) coupled in series or batteries of a different kind (e.g., AA batteries) coupled in series.

Figure 5:
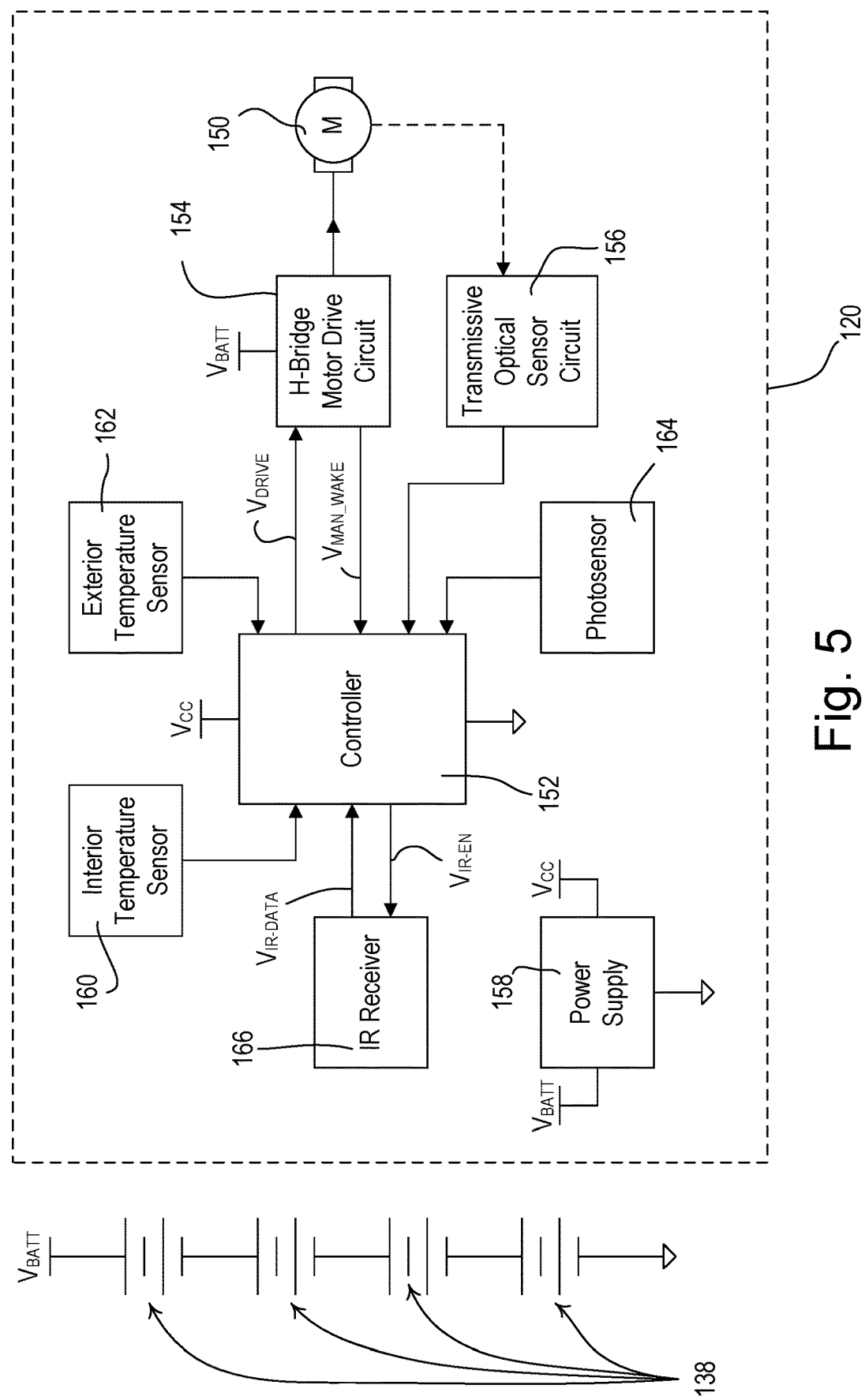
FIG. 5 is a simplified block diagram of a motor drive unit of a motorized window treatment (e.g., the motorized window treatment of FIG. 1)

FIG. 5 is a simplified block diagram of a motor drive unit for a battery-powered motorized window treatment (e.g., the motor drive unit 120 of the battery-powered motorized window treatment 110). The motor drive unit 120 comprises a controller 152 for controlling the operation of the motor 150, which may comprise, for example, a DC motor. The controller 152 may comprise, for example, a microprocessor, a programmable logic device (PLD), a microcontroller, an application specific integrated circuit (ASIC), a field-programmable gate array (FPGA), or any suitable processing device or control circuit. The controller 152 is coupled to an H-bridge motor drive circuit 154 for driving the motor 150 via a set of drive signals $V_{DRIVE}$ to control the weighting element 116 and the cellular shade fabric 112 between the fully-open position $P_{FULLY-OPEN}$ and the fully-closed position $P_{FULLY-CLOSED}$. The controller 152 is operable to rotate the motor 150 at a constant rotational speed by controlling the H-bridge motor drive circuit 154 to supply a pulse-width modulated (PWM) drive signal having a constant duty cycle to the motor. The controller 152 is able to change the rotational speed of the motor 150 by adjusting the duty cycle of the PWM signal applied to the motor and to change the direction of rotation of the motor by changing the polarity of the PWM drive signal applied to the motor.

The controller 152 receives information regarding the rotational position and direction of rotation of the motor 150 from a rotational position sensor, such as, for example, a transmissive optical sensor circuit 156. The rotational position sensor may also comprise other suitable position sensors, such as, for example, Hall-effect, optical or resistive sensors. The controller 152 is operable to determine a rotational position of the motor 150 in response to the transmissive optical sensor circuit 156, and to use the rotational position of the motor to determine a present position $P_{PRES}$ of the weighting element 116. The controller 152 may comprise an internal non-volatile memory (or alternatively, an external memory coupled to the controller) for storage of the present position $P_{PRES}$ of the shade fabric 112, the fully open position $P_{FULLY-OPEN}$, and the fully closed position $P_{FULLY-CLOSED}$. The operation of the H-bridge motor drive circuit 154 and the use of sensor devices to track the direction and speed of the motor drive unit 120 is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, the entire disclosures of which are herein incorporated by reference.

As previously mentioned, the motor drive unit 120 receives power from the series-coupled batteries 138, which provide a battery voltage $V_{BATT}$. For example, the batteries 138 may comprise D-cell batteries having rated voltages of approximately 1.5 volts, such that the battery voltage $V_{BATT}$ has a magnitude of approximately 6 volts. The H-bridge motor drive circuit 154 receives the battery voltage $V_{BATT}$ for driving the motor 150. The motor drive unit 120 further comprises a power supply 158 (e.g., a linear regulator) that receives the battery voltage $V_{BATT}$ and generates a DC supply voltage $V_{CC}$ (e.g., approximately 3.3 volts) for powering the controller 152 and other low-voltage circuitry of the motor drive unit.

The motor drive unit 120 comprises an internal temperature sensor 160 that is located adjacent the internal side 122 of the headrail 114 (i.e., a room-side temperature sensor), and a external temperature sensor 162 that is located adjacent the external side 124 of the headrail (i.e., a window-side temperature sensor). The room-side temperature sensor 160 is operable to measure an interior temperature $T_{INT}$ inside the room in which the motorized window treatment 110 is installed, while the external temperature sensor 162 is operable to measure an exterior temperature $T_{EXT}$ between the headrail 114 and the window 104. The motor drive unit 120 further comprises a photosensor 164, which is located adjacent the external side 124 of the headrail 114, and is directed to measure the amount of sunlight that may be shining on the window 104. Alternatively, the exterior (window-side) temperature sensor 162 may be implemented as a sensor label (external to the headrail 114 of the battery powered motorized window treatment 110) that is operable to be affixed to an inside surface of a window. The sensor label may be coupled to the motor drive unit 120 through low voltage wiring (not shown).

The controller 152 receives inputs from the internal temperature sensor 160, the external temperature sensor 162, the photosensor 164, and the IR receiver 166. The controller 152 may operate in an eco-mode to control the position of the weighting element 116 and the cellular shade fabric 112 in response to the internal temperature sensor 160, the external temperature sensor 162, and the photosensor 164, so as to provide energy savings. When operating in the eco-mode, the controller 152 adjusts the amount of the window 104 covered by the cellular shade fabric 112 to attempt to save energy, for example, by reducing the amount of electrical energy consumed by other control systems in the building in which the motorized window treatment 110 is installed. For example, the controller 152 may adjust the present position $P_{PRES}$ of the weighting element 116 to control the amount of daylight entering the room in which the motorized window treatment 110 is installed, such that lighting loads in the room may be turned off or dimmed to thus save energy. In addition, the controller 152 may adjust the present position $P_{PRES}$ of the weighting element 116 to control the heat flow through the window 104 in order to lighten the load on the heating, air-conditioning, and ventilation (HVAC) system in the building in which the motorized window treatment 110 is installed.

A user of the window treatment system 100 is able to adjust the position of the weighting element 116 and the cellular shade fabric 112 by using the remote control 118 to transmit commands to the motor drive unit 120 via the IR signals. The IR receiver 166 receives the IR signals and provides an IR data control signal $V_{IR-DATA}$ to the controller 152, such that the controller is operable to receive the commands from the remote control 118. The controller 152 is operable to put the IR receiver 166 to sleep (i.e., disable the IR receiver) and to periodically wake the IR receiver up (i.e., enable the IR receiver) via an IR enable control signal $V_{IR-EN}$, as will be described in greater detail below. An example of an IR control system is described in greater detail in U.S. Pat. No. 6,545,434, issued Apr. 8, 2003, entitled MULTI-SCENE PRESET LIGHTING CONTROLLER, the entire disclosure of which is hereby incorporated by reference. Alternatively, the IR receiver 166 could comprise a radio-frequency (RF) receiver or transceiver for receiving RF signals transmitted by an RF remote control. Examples of RF control systems are described in greater detail in commonly-assigned U.S. patent application Ser. No. 12/033,223, filed Feb. 19, 2008, entitled COMMUNI- CATION PROTOCOL FOR A RADIO-FREQUENCY LOAD CONTROL SYSTEM, and U.S. patent application Ser. No. 13/415,084, filed Mar. 8, 2012, entitled MOTORIZED WINDOW TREATMENT, the entire disclosures of which are hereby incorporated by reference.

Figure 8:
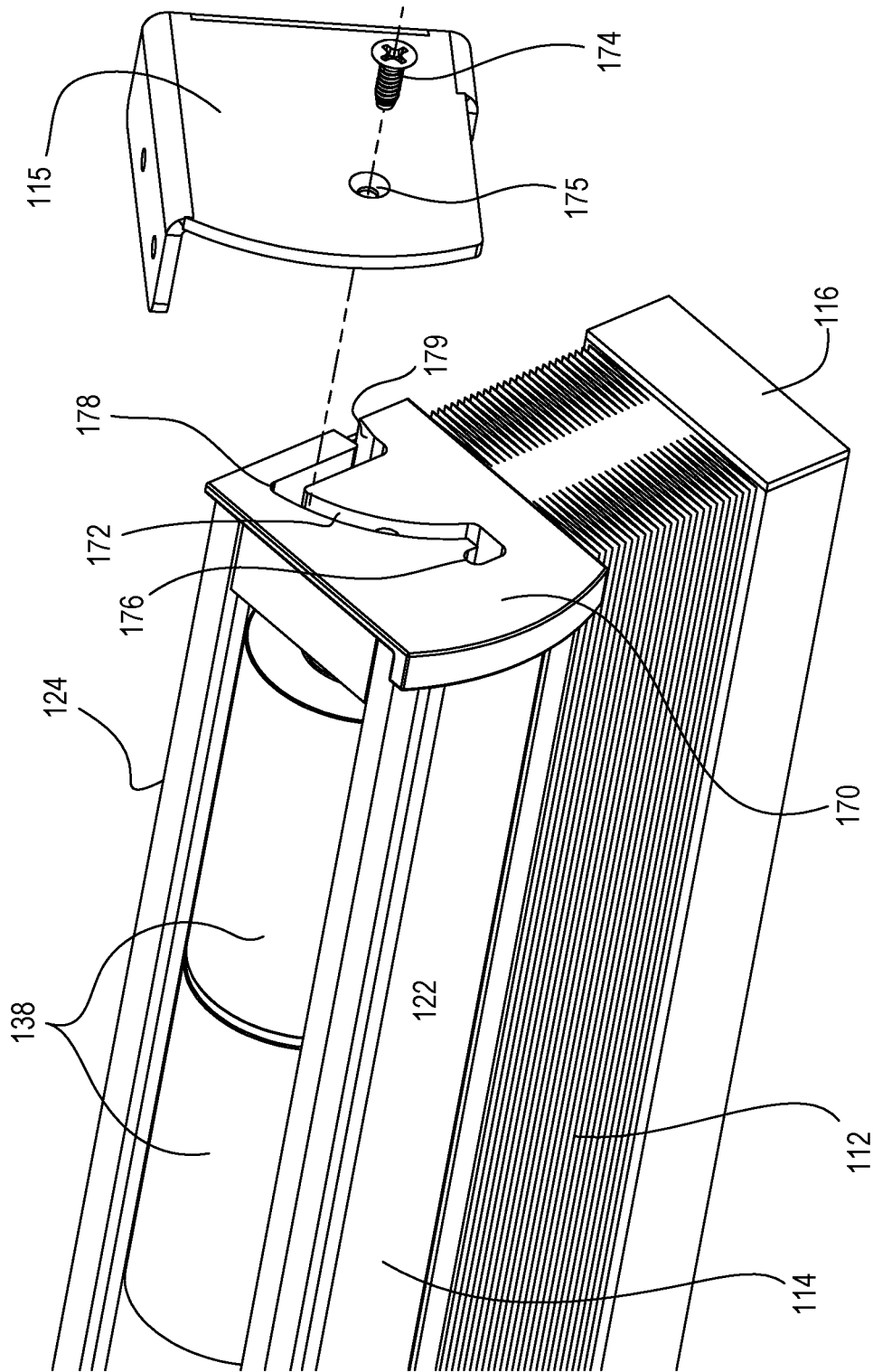
FIG. 8 is an enlarged perspective view of one end of the motorized window treatment of FIG. 6A showing how a screw is received in a channel of an endcap of the motorized window treatment.

To allow the user to change the batteries 138 when needed, the motorized window treatment 110 is operable to be adjusted to a service position, in which the open top of the headrail 114 is positioned to allow for easy access to the batteries. FIG. 6A is a perspective view and FIG. 6B is a right side view of a motorized window treatment (e.g., the motorized window treatment 110) as the motorized window treatment is being moved to a service position. FIG. 7A is a perspective view and FIG. 7B is a right side view of the motorized window treatment 110 when the motorized window treatment is in the service position. The motorized window treatment 110 comprises two endcaps 170 located at each side of the headrail 114. The endcaps 170 each comprise a channel 172, which receives a screw 174 (i.e., a protuberance or pin) that extends through an opening 175 (FIG. 8) in the adjacent mounting bracket 115. FIG. 8 is an enlarged perspective view of one end of the motorized window treatment 110 showing how the screw 174 is received in the channel 172 of the endcap 170. When the motorized window treatment 110 is in a normal position (as shown in FIG. 3), each screw 174 rests in an end 176 of the respective channel 172, such that the headrail 114 is held in position between the mounting brackets 115 and the shade fabric 112 hangs vertically below the headrail.

When the batteries 138 need to be accessed, the headrail 114 may be lifted up by a user, such that the screws 174 are no longer positioned in the respective ends 176 and may travel through the channels 172 as shown in FIG. 6B. Each screw 172 may then come to rest in an elbow 178 of the respective channel 172 as shown in FIG. 7B, such that the motorized window treatment 110 is in the service position. When in the service position, the headrail 114 is operable to pivot about the screws 174 in the respective elbows 178 to allow the user to access the batteries 138 from the top of the headrail. To remove the headrail 114 from the mounting brackets 115, the user may lift the headrail 114 to move the screws 174 through the respective channels 172 and out of respective channel openings 179.

Accordingly, the headrail 114 is adapted to be moved down and away from the window 104 and into the service position, so that the headrail may then be tilted to allow the user to access the batteries 138 without the use of tools. Since the headrail 114 is moved horizontally away from the window 104 when in the service position, there is room between the headrail and the window in which the shade fabric 112 may be located when the top of the headrail 114 is rotated towards the user.

Figure 9:
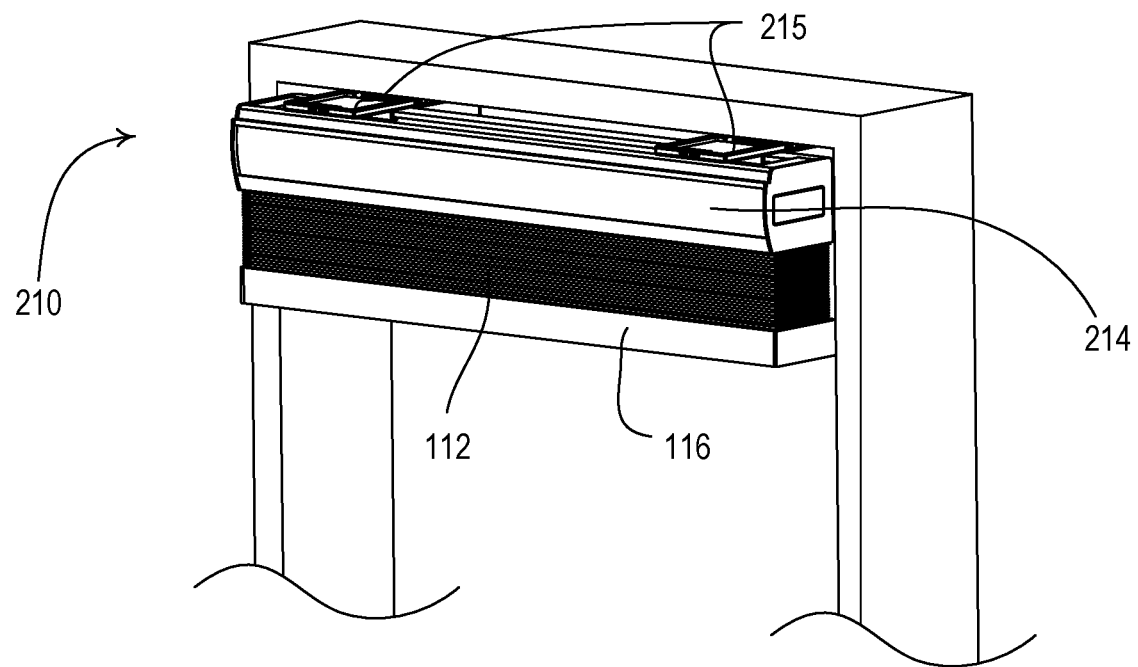
FIG. 9 is a perspective view of an example motorized window treatment as the motorized window treatment is being moved to a service position.
Figure 10:
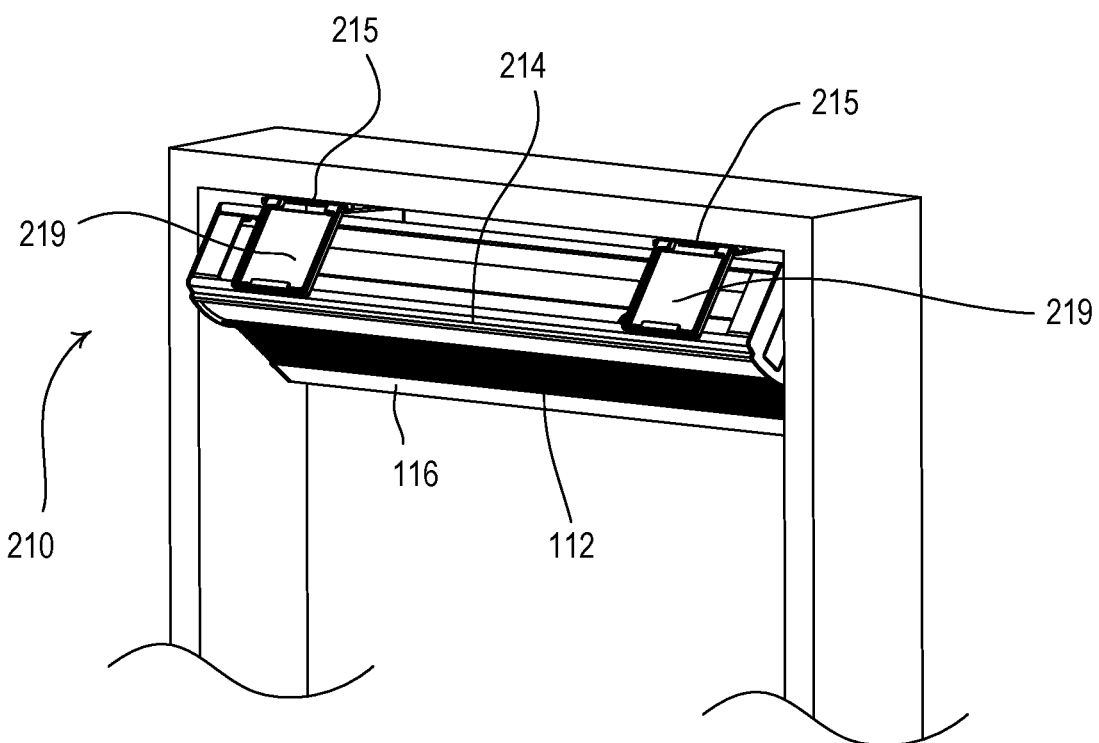
FIG. 10 is a perspective view of the motorized window treatment of FIG. 9 when the motorized window treatment is in the service position.

FIGS. 9 and 10 are perspective views of an example motorized window treatment 210 having a headrail 214 that may be pulled out in a horizontal direction away from a window and then rotated into a service position to allow access to batteries (e.g., the batteries 138). The motorized window treatment 210 comprises top mounting brackets 215 located over the top of the headrail 214, and plates 219 that are received in the mounting brackets. The user is operable to pull the headrail 214 away from the window, such that the plates 219 slide through the mounting brackets 215 as shown in FIG. 9. The plates 219 are then able to pivot with respect to the mounting brackets 215, such that the top of the headrail 214 may be rotated towards the user to allow access to the batteries 138 located in the headrail as shown in FIG. 10.

FIG. 11A is a perspective view and FIG. 11B is a right side view of an example motorized window treatment 310 having mounting brackets 370 for rotating the motorized window treatment into a service position. FIG. 12A is a perspective view and FIG. 12B is a right side view of the motorized window treatment 310 when the motorized window treatment 310 is in the service position. Each mounting bracket 370 of the motorized window treatment 310 comprises a release button 372, which may be actuated (e.g., pushed) to release a headrail (e.g., the headrail 114) from a locked position (as shown in FIGS. 11A and 11B), such that the headrail 114 may be rotated into the service position and batteries in the headrail (e.g., the batteries 138) may be accessed (as shown in FIGS. 12A and 12B). Specifically, the open end of the headrail 114 is rotated to a position laterally away from the window and downward to expose the batteries 138 in the headrail.

The release buttons 372 are located above the headrail 114 and protrude slightly over the internal side 122 of the headrail, such that the buttons are partially hidden from view when the motorized window treatment 310 is installed. The release buttons 372 may be labeled with appropriate text (such as "push") to inform the user of the required action to release the motorized window treatment 310 from the locked position. The headrail 114 is flexible enough, such that the buttons 372 of the mounting brackets 370 may be actuated one at a time in order to release the headrail from the locked position. Accordingly, no tools are required to release the motorized window treatment 310 from the locked position to enter the service position. Alternatively, the release buttons 372 may be implemented as pull-tabs or the motorized window treatment 310 could comprise latches that require tools to be unlatched.

FIG. 13A is an enlarged perspective view of one of the mounting brackets 370 in the locked position. FIG. 13B is an enlarged perspective view of the mounting bracket 370 in the service position. The mounting bracket 370 comprises a fixed mounting portion 374 and a rotating portion 375 that is rotatably coupled to the mounting portion 374 via an axle rod 376. The mounting portion 374 is adapted to be fastened to a vertical surface (e.g., a wall) via screws (not shown) received through mounting holes 378 or to be fastened to a horizontal surface (e.g., a ceiling or the top of an opening) via screws received through mounting holes 379. The rotating portion 374 is adapted to be connected to the headrail 114 of the motorized window treatment 310 via a lip 380 and a clip 382. Specifically, the internal side 122 of the headrail 114 is adapted to rest on the lip 380 (as shown in FIG. 12A) and the bottom side of the external side 124 of the headrail is adapted to snap into the clip 382. When a user actuates the release button 372, the rotating portion 374 is operable to pivot about the axle rod 376 thus rotating the top of the headrail 114 towards the user into the service position, such that the batteries 138 may be accessed.

As shown in FIG. 11B, the axle rod 376 about which the rotating portion 374 pivots is located below the headrail 114, such that when the motorized window treatment 310 is released from the locked position, the center of gravity of the headrail causes the top of the headrail to rotate down on its own (i.e., without the need for the user to physically rotate the top of the headrail towards the user) with or without the batteries 138 installed in the headrail. The axle rod 376 is positioned above the weighting element 116 (i.e., behind the cellular shade fabric 112) when the motorized window treatment 310 is in the fully-open position $P_{FULLY\text{-}OPEN}$, such that the mounting brackets 370 cannot be seen by the user.

Each mounting bracket 370 also comprises a coil spring 384, which is wound around the axle rod 376 and comprises an inside leg 385 that is positioned on the inner side of the rotating portion 375 and an outside leg (not shown) that is positioned on the outer side of the mounting portion 374. The spring 384 operates to provide a controlled movement of the motorized window treatment 310 when the headrail 114 is released from the locked position and the rotating portion 375 rotates about the axle rod 376 into the service position. The spring 384 also limits the distance that the headrail 114 is able to be rotated (e.g., to prevent the batteries 138 from falling out of the headrail). The inside leg 385 contacts the rotating portion 375 and the outside leg contacts the mounting portion 374 to bias the rotating portion towards the mounting portion. The spring 384 is sized such that the headrail 114 rotates down on its own, but does not rotate so far that the batteries 138 are able to fall out of the headrail. Since the user may individually actuate the buttons 372 of the mounting brackets 370 to cause the headrail 114 move into the service position, the user only needs one free hand available to move the motorized window treatment 310 into the service position and change the batteries 138 (i.e., the other hand may be used to balance the user, for example, by holding onto a ladder).

Figure 14B:
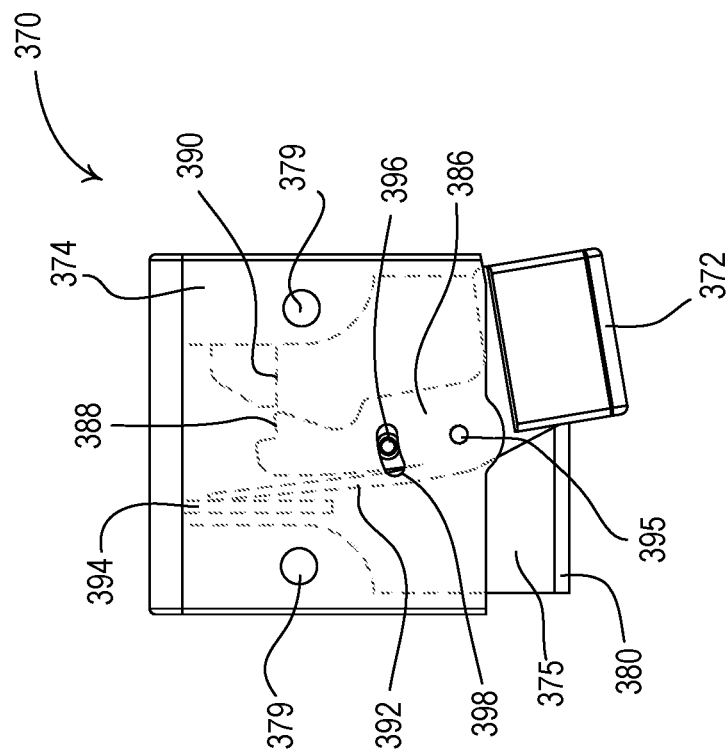
FIG. 14B is a top view of the mounting bracket of FIG. 13A as a release button is being actuated to release mounting bracket from the locked position.
Figure 14A:
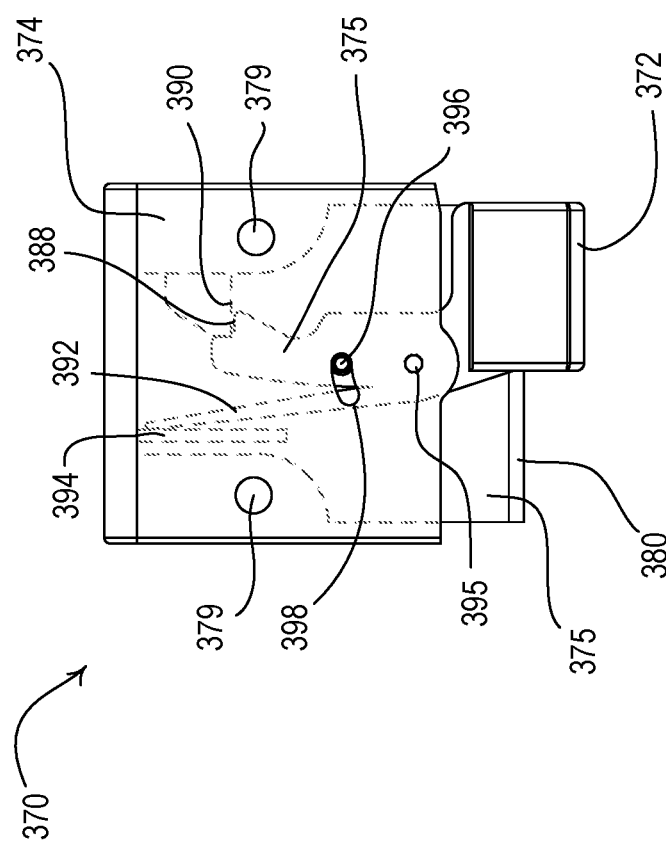
FIG. 14A is a top view of one of the mounting brackets of FIG. 13A in the locked position showing a latch mechanism in greater detail.

Each mounting bracket 370 further comprises a latch mechanism 386 coupled to the respective button 372. The latch mechanism 286 locks the rotating portion 375 in the locked position, and releases the rotating portion to allow the headrail 114 to move into the service position in response to an actuation of the release button 372. FIG. 14A is a top view of one of the mounting brackets 370 in the locked position showing the latch mechanism 386 in greater detail. FIG. 14B is a top view of the mounting bracket 370 as the release button 372 is being actuated to release the rotating portion 375 from the locked position. The latch mechanism 386 comprises a notch 388 adapted to contact a locking surface 390 (FIG. 13B) of the rotating portion 375 to hold the rotating portion in the locked position. The latch mechanism 386 further comprises an elongated spring member 392 adapted to push against a wall 394 of the mounting portion 374 to thus keep the notch 388 locked against the locking surface 390. When the release button 372 is pushed in towards the mounting bracket 370, the latch mechanism 386 rotates about a rivet 395, a pin 396 travels through a channel 398 to guide the movement of the latch mechanism, and the spring member 392 flexes against the wall 394. Accordingly, the notch 388 of the latch mechanism 386 no longer contacts the locking surface 390 of the rotating portion 375, such that the rotating portion and the headrail 114 are able to rotate freely about the axle rod 376.

Figure 15B:
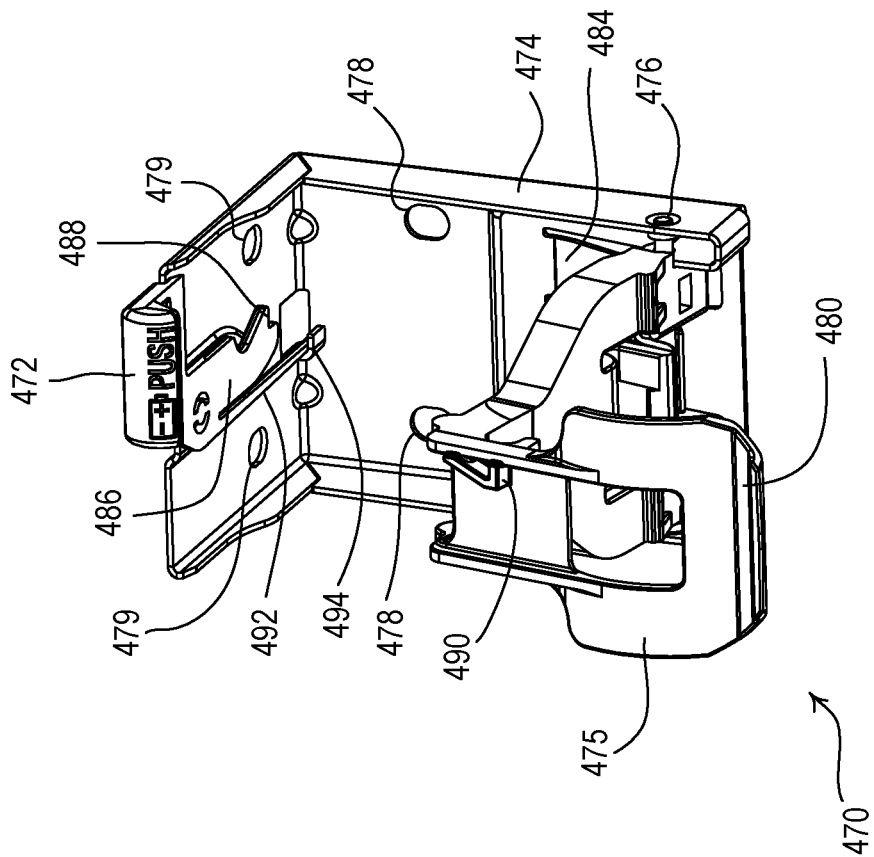
FIGS. 15A and 15B are enlarged perspective views of an alternative example of a mounting bracket for a motorized window treatment shown in a locked position and a service position, respectively.
Figure 15A:
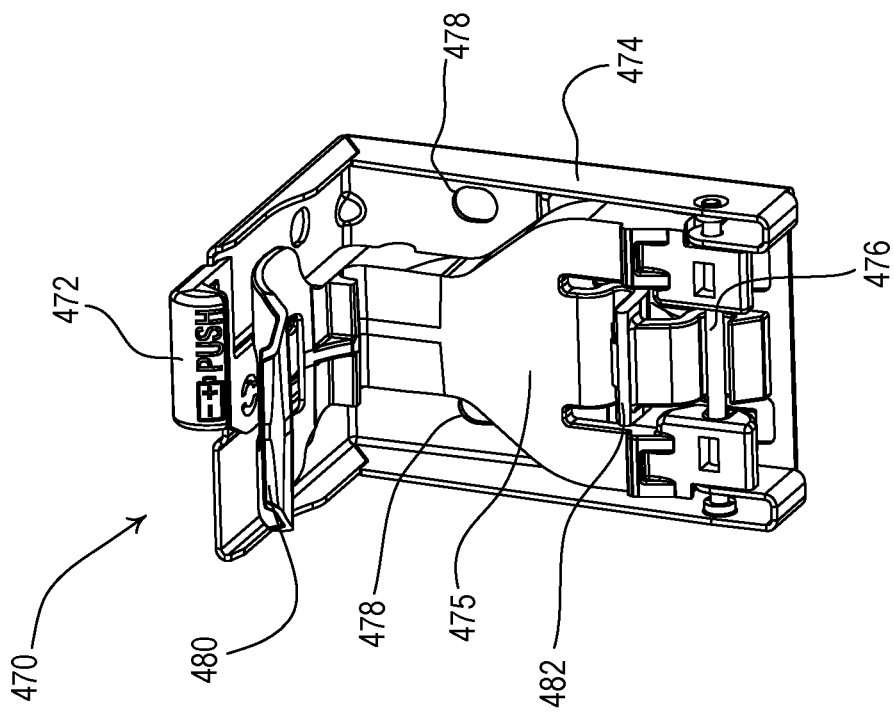

FIGS. 15A and 15B are enlarged perspective views of an alternate example of a mounting bracket 470 for a motorized window treatment (e.g., the motorized window treatment 310). Specifically, the mounting bracket 470 is shown in a locked position in FIG. 15A and in a service position in FIG. 15B. The mounting bracket 470 comprises a release button 472 that may be pushed to release the headrail 114 from the locked position, such that the headrail 114 may be rotated into the service position and the batteries 138 may be accessed. The mounting bracket 470 comprises a fixed mounting portion 474 and a rotating portion 475 that is rotatably coupled to the mounting portion via an axle rod 476. The mounting portion 474 may be mounted to a vertical surface or a horizontal surface via screws (not shown) received through vertical mounting holes 478 or horizontal mounting holes 479, respectively. The rotating portion 474 comprises a lip 480 and a clip 482 for connecting to the headrail 114 of the motorized window treatment 310 in a similar manner as the mounting brackets 370. When a user actuates the release button 472, the rotating portion 474 pivots about the axle rod 476 thus rotating the top of the headrail 114 towards the user into the service position, such that the batteries 138 may be accessed.

Figure 16B:
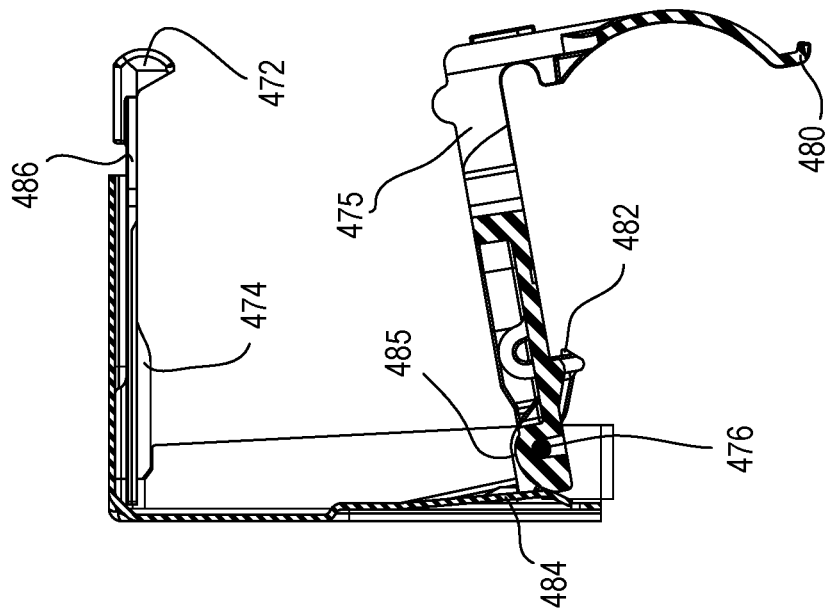
FIGS. 16A and 16B are left side cross-sectional views of the mounting bracket of FIGS. 15A and 15B shown in the locked position and the service position, respectively.
Figure 16A:
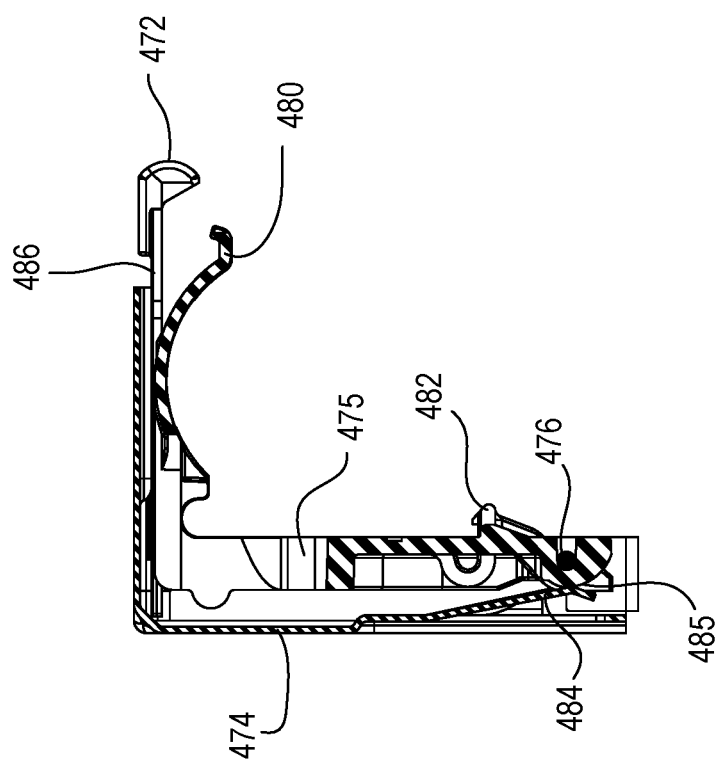

The mounting portion 474 comprises two spring arms 484 (one of which is shown in FIG. 15B) that contact the rotating portion 475. FIGS. 16A and 16B are left side cross-sectional views of the mounting bracket 470 taken through the center of the left spring arm 484 with the mounting bracket shown in the locked position and the service position, respectively. The spring arms 484 contact cam portions 485 on the rotating portion 475 to provide a controlled movement of the motorized window treatment 310 when the headrail 114 is released from the locked position and the rotating portion rotates about the axle rod 476 into the service position. Alternatively, the rotating portion 475 could comprise one or more spring arms for contacting respective cam portions of the mounting portion 474.

Referring back to FIGS. 15A and 15B, the mounting bracket 470 further comprises a latch mechanism 486 that locks the rotating portion 475 in the locked position, and releases the rotating portion to allow the headrail 114 to move into the service position in response to an actuation of the release button 472. The latch mechanism 486 comprises a notch 488 and an elongated spring member 492 adapted to push against a tab 494 of the mounting portion 474 to hold the notch 488 against a locking surface 490 of the rotating portion 475 to thus hold the rotating portion in the locked position. When the release button 472 is pushed in towards the mounting bracket 470, the latch mechanism 486 rotates and the spring member 492 flexes against the wall 494 until the notch 488 no longer contacts the locking surface 490 of the rotating portion 475 and the rotating portion 475 is able to rotate freely about the axle rod 476.

While the battery-powered motorized window treatment has been described having the cellular shade fabric 112, the concepts described herein could be applied to other types of motorized window treatments, such as, for example, Roman shades and Venetian blinds. An example of a Roman shade system is described in greater detail in commonly-assigned U.S. patent application Ser. No. 12/784,096, filed Mar. 20, 2010, entitled ROMAN SHADE SYSTEM, the entire disclosure of which is hereby incorporated by reference. An example of a Venetian blind system is described in greater detail in commonly-assigned U.S. Provisional Patent Application No. 61/384,005, filed Sep. 17, 2010, entitled MOTORIZED VENETIAN BLIND SYSTEM, the entire disclosure of which is hereby incorporated by reference.

Figure 17:
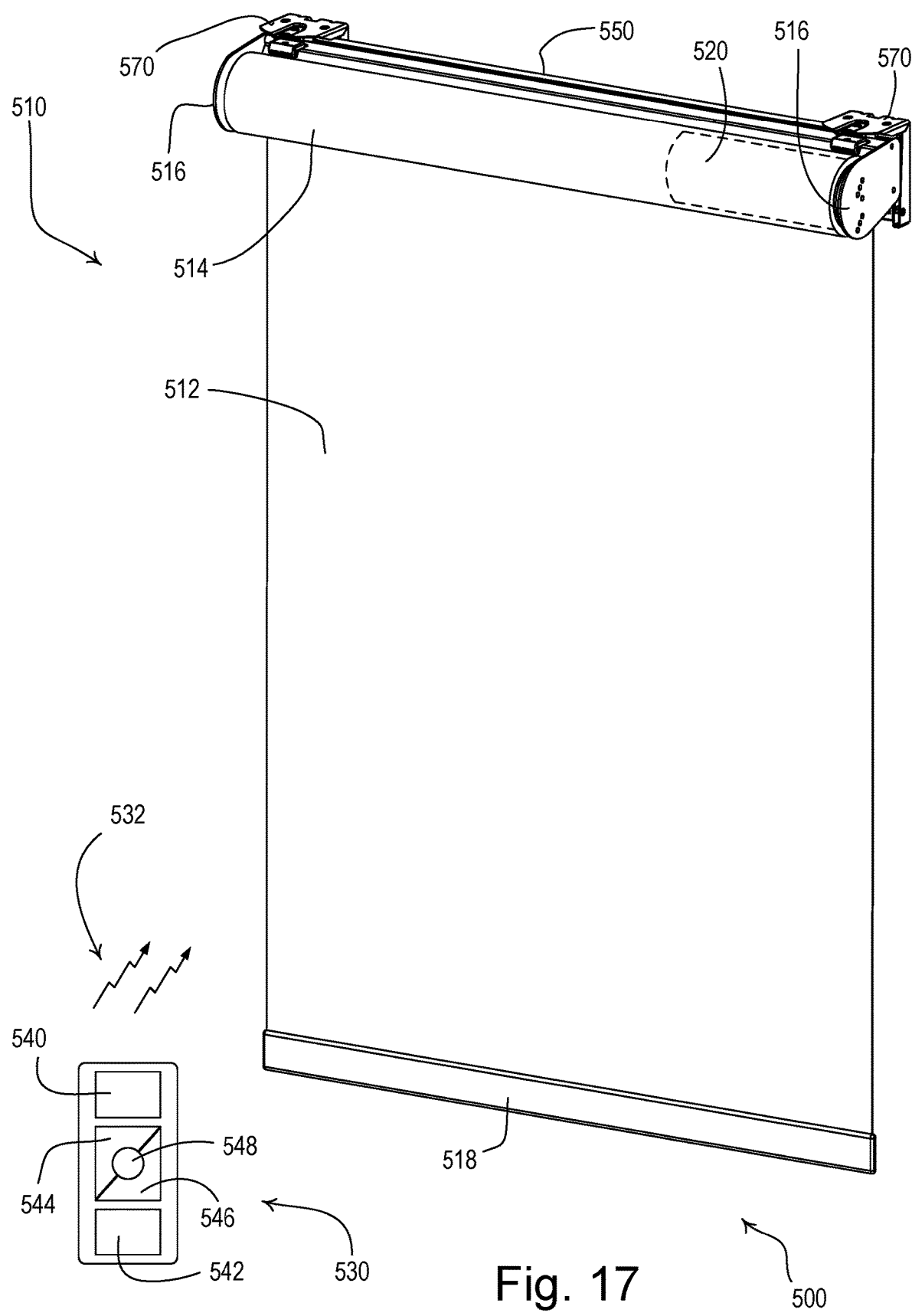
FIG. 17 is a perspective view of an example motorized window treatment system having a battery-powered motorized roller shade.

FIG. 17 is a perspective view of an example motorized window treatment system 500 having a battery-powered motorized roller shade 510. The motorized roller shade 510 comprises a covering material, for example, a flexible roller shade fabric 512, and a roller tube 514 that is rotatably coupled between two roller tube end brackets 516. The shade fabric 512 has a top end that is connected to the roller tube 514 and extends from the roller tube to a hembar 518 at a bottom end. The shade fabric 512 raises and is windingly received around the roller tube 514 as the roller tube rotates in a first direction and lowers to cover the window as the roller tube rotates in a second opposite direction. Alternatively, the flexible roller shade fabric 512 could comprise a woven cloth, a non-woven material, a light control film, a screen, a mesh material, a scrim material, or any suitable covering material adapted to be windingly received around the roller tube 514.

The motorized roller shade 510 may further comprise a motor drive unit 520 located inside the roller tube 514 for rotating the roller tube to thus raise and lower the shade fabric 512 between a fully-open position $P_{FULLY-OPEN}$ and a fully-closed position $P_{FULLY-CLOSED}$ to control the amount of daylight entering a room or space. The motor drive unit 520 may comprise a wireless receiver (not shown), for example, a radio-frequency (RF) receiver, operable to receive RF signals 532 from an RF remote control 530 for controlling the operation of the motorized roller shade 510. The RF remote control 530 is operable to transmit digital messages including commands to control the motorized roller shade 510 via the RF signals 532 in response to actuations of a plurality of buttons, e.g., an open button 540, a close button 542, a raise button 544, a lower button 546, and a preset button 548. The motor drive unit 520 controls the roller shade fabric 512 to the fully-open position $P_{FULLY-OPEN}$ and the fully-closed position $P_{FULLY-CLOSED}$ in response to actuations of the open button 540 and the close button 542 of the remote control 530, respectively. The motor drive unit 520 raises and lowers the roller shade fabric 512 in response to actuations of the raise button 544 and the lower button 546, respectively. The motor drive unit 520 controls the roller shade fabric 512 to a preset position $P_{PRESET}$ in response to actuations of the preset button 748. The structure of an RF motorized roller shade is described in greater detail in commonly-assigned U.S. Pat. No. 7,723,939, issued May 25, 2010, entitled RADIO-FREQUENCY CONTROLLED ROLLER SHADE, the entire disclosure of which is hereby incorporated by reference.

The motorized roller shade 510 further comprises a battery enclosure 550 (e.g., an open-ended enclosure) that is connected to and extends between the roller tube end brackets 516 (i.e., for approximately the width of the shade fabric 512), such that the shade fabric 512 hangs from a position adjacent the enclosure (e.g., on the roller tube 514). The battery enclosure 550 holds one or more series-connected batteries 552 (FIG. 19) that are electrically coupled to the motor drive unit 520 in the roller tube 514 for powering the motor drive unit. The batteries 552 may be received in a battery compartment 554 (FIG. 19), i.e., a channel or opening, on a rear side of the battery enclosure 500. The battery compartment 554 may also comprise a battery holder (not shown) having curved tabs or tongs for holding the batteries 552 in the battery compartment. The battery enclosure 550 may also comprise an RF antenna (not shown) electrically coupled to the RF transceiver in the motor drive unit 520 for receiving the RF signals 532. Alternatively, the antenna could simply extend from the motor drive unit 520 and hang from one of the roller tube end brackets 516. In addition, the motor drive unit 520 could alternatively comprise an RF transceiver for transmitting and receiving the RF signals 532 via the antenna.

Figure 18:
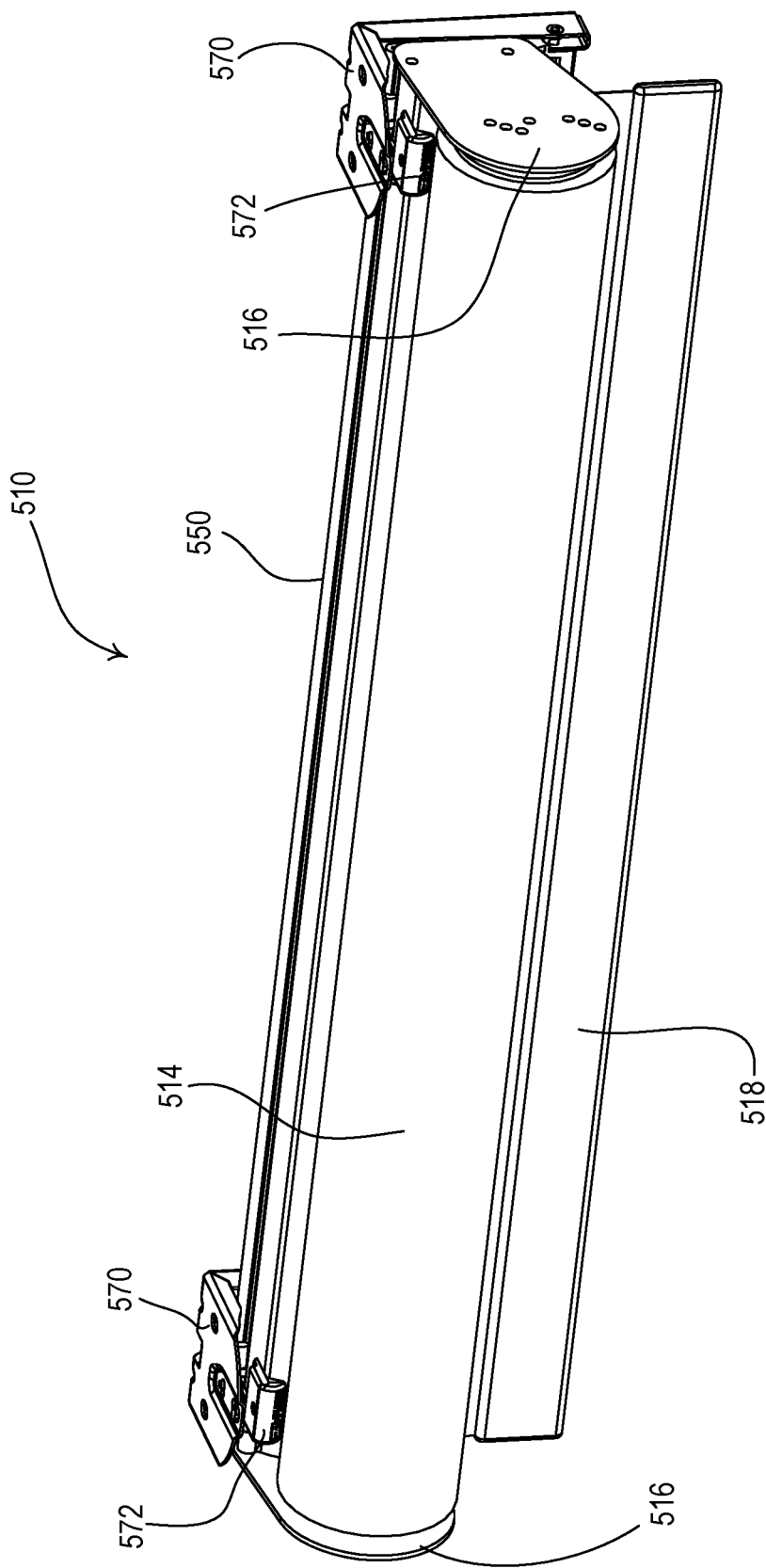
FIG. 18 is a perspective view of the motorized roller shade of FIG. 17 in a locked position when the roller shade fabric is in a fully-open position.
Figure 19:
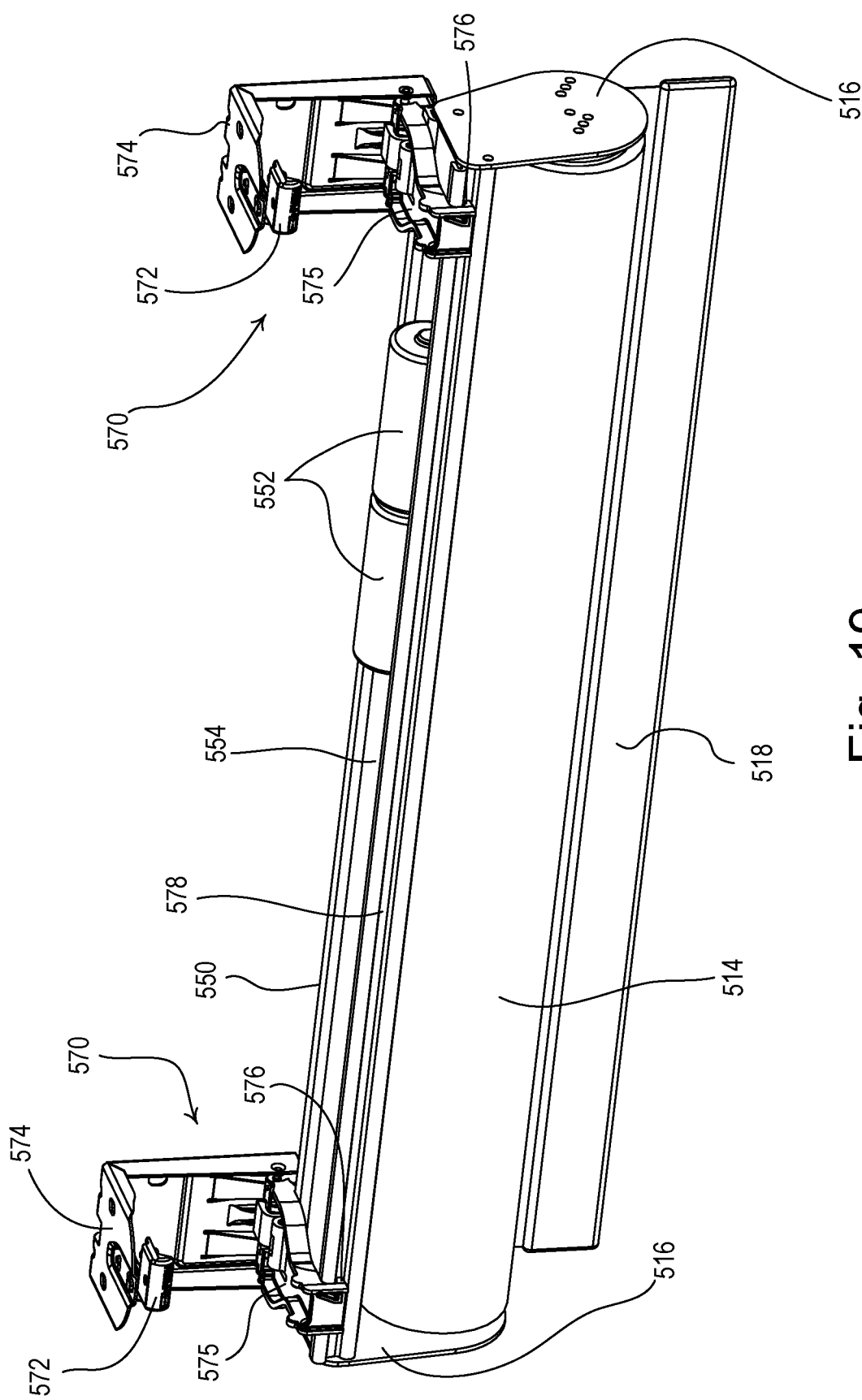
FIG. 19 is a perspective view of the motorized roller shade of FIG. 17 in the service position when the roller shade fabric is in the fully-open position.

The motorized roller shade 510 further comprises two mounting brackets 570 coupled to the enclosure 550 for mounting the motorized roller shade to a vertical or horizontal surface. The mounting brackets 570 allow the motorized roller shade 510 to be rotated into a service position in which batteries 552 may be accessed. FIG. 18 is a perspective view of the motorized roller shade 510 in a locked position when the roller shade fabric 512 is in the fully-open position $P_{FULLY-OPEN}$. When the motorized roller shade 510 is in a locked position, an open end of the battery enclosure 550 may face towards the window. FIG. 19 is a perspective view of the motorized roller shade 510 in the service position when the roller shade fabric 512 is in the fully-open position $P_{FULLY-OPEN}$. The mounting brackets 570 may each have a similar structure to the mounting brackets 370, 470 shown in FIGS. 13A-16B. In the service position, the open end of the battery enclosure 550 is rotated to face upwardly to expose the open end of the battery enclosure for access to the batteries 552 contained within the enclosure without removing the motorized window treatment from the mounting location at the top of the window.

Each rotatable mounting bracket 570 of the motorized roller shade 510 comprises a release button 572, which may be pushed to release the motorized roller shade from the locked position, such that the enclosure 550 may be rotated into the service position and the batteries 552 may be accessed (as shown in FIG. 19). The release buttons 572 may be labeled with appropriate text (such as "push") to inform the user of the required action to release the motorized roller shade 510 from the locked position. The release buttons 572 are located above the roller tube 514 and may be hidden from view (from below the roller tube) when the motorized roller shade 510 is in the locked position (as shown in FIG. 18). The roller tube end brackets 516 may extend away from the window and down towards the floor, such that the roller tube 514 is offset horizontally and vertically from the battery enclosure 550 to provide space above the roller tube for a user to actuate the release buttons 572 when the motorized roller shade 510 is in the locked position. Accordingly, no tools are required to release the motorized roller shade 510 from the locked position to the service position.

As shown in FIG. 19, each mounting bracket 570 comprises a fixed mounting portion 574 and a rotating portion 575 that is rotatably coupled to the mounting portion. The rotating portion 575 of each mounting bracket 570 comprises a tab 576 that is adapted to be received in a slot 578 in the top side of the battery enclosure 550, while the bottom side of the battery enclosure snaps into a clip (not shown) of the rotating portion. When a user actuates the release button 572, the rotating portion 574 is operable to rotate the battery enclosure 550 into the service position, such that the batteries 552 in the battery compartment 554 may be accessed from above the motorized roller shade 510. When the motorized roller shade 510 is released from the locked position, the center of gravity of the motorized roller shade causes the battery enclosure 550 to rotate down on its own (i.e., without the need for the user to physically rotate the battery enclosure towards the user) with or without the batteries 552 installed in the battery enclosure. Alternatively, the battery compartment 554 could be in a top side of the battery enclosure 500. While FIG. 19 only shows two batteries 552, the battery compartment 554 of the battery enclosure 550 could hold additional or different types of batteries.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mounting bracket for a motorized window treatment adapted to be mounted to a surface, the mounting bracket comprising:
   a mounting portion adapted to be fastened to the surface; and
   a rotating portion coupled to the mounting portion by an axle and adapted to be coupled to a headrail of the motorized window treatment;
   wherein the mounting portion is configured to engage the rotating portion to maintain the rotating portion in a first position and is configured to disengage the rotating portion in response to a button being pressed to allow the rotating portion to rotate about the axle to a second position with respect to the mounting portion, the rotating portion remaining coupled to the headrail when the rotating portion is in both the first and second positions such that the headrail is rotated along with the rotating portion.

2. The mounting bracket of claim 1, wherein the axle defines a horizontal axis about which the rotating portion rotates.

3. The mounting bracket of claim 1, further comprising:
a spring for biasing the rotating portion towards the mounting portion, such that the headrail rotates in a controlled movement when the headrail is released from the first position.

4. The mounting bracket of claim 3, wherein the spring comprises a coil spring wrapped around the axle and contacting the rotating portion and the mounting portion to bias the rotating portion towards the mounting portion.

5. The mounting bracket of claim 4, wherein the spring comprises at least one spring arm on the mounting portion adapted to contact the rotating portion, such that the headrail rotates in a controlled movement when the headrail is released from the first position.

6. The mounting bracket of claim 2, wherein the axle is located below a clip of the rotating portion, such that the center of gravity of the headrail is adapted to cause the headrail to rotate from the first position to the second position on its own.

7. The mounting bracket of claim 1, further comprising:
a latch for holding the rotating portion in the first position.

8. The mounting bracket of claim 7, wherein the button is coupled to the latch for releasing the rotating portion from the first position in response to an actuation of the button.

9. The mounting bracket of claim 8, wherein the button is pushed to release the rotating portion from a locked position.

10. The mounting bracket of claim 1, wherein the rotating portion is adapted to be coupled to the top side of the headrail, and comprises a clip adapted to be coupled to a bottom side of the headrail.

11. A mounting bracket for a motorized window treatment adapted to be mounted to a surface, the mounting bracket comprising:

a mounting portion adapted to be fastened to the surface;
a rotating portion adapted to be coupled to a top side of a headrail, the rotating portion comprising a clip adapted to be coupled to a bottom side of the headrail; and
an axle for rotatably coupling the rotating portion to the mounting portion, such that the rotating portion pivots about the axle with respect to the mounting portion;
wherein the mounting portion is configured to engage the rotating portion to maintain the rotating portion in a first position and is configured to disengage the rotating portion to allow the rotating portion to pivot about the axle to a second position while the rotating portion remains coupled to the headrail,
wherein the axle is located below the clip of the rotating portion, such that the center of gravity of the headrail is adapted to cause the headrail to rotate in a first direction to the second position on its own when the mounting portion is disengaged from the rotating portion.

12. The mounting bracket of claim 11, further comprising:
a latch for holding the rotating portion in the first position, which is a locked position;
wherein the rotating portion is configured to be released from the locked position in order to rotate the headrail into the second position, which is a service position.

13. The mounting bracket of claim 12, further comprising:
a spring for biasing the rotating portion towards the mounting portion, such that the headrail rotates in a controlled movement when the rotating portion is released from the locked position.

14. The mounting bracket of claim 13, wherein the spring comprises a coil spring wrapped around the axle and contacting the rotating portion and the mounting portion to bias the rotating portion towards the mounting portion.

15. The mounting bracket of claim 13, wherein the spring comprises at least one spring arm on the mounting portion adapted to contact the rotating portion, such that the headrail rotates in a controlled movement when the rotating portion is released from the locked position.

16. The mounting bracket of claim 12, further comprising:
a button coupled to the latch for releasing the rotating portion from the locked position to rotate the headrail into the service position in response to an actuation of the button.

17. The mounting bracket of claim 16, wherein the button is pushed to release the rotating portion from the locked position.

* * * * *